(12) United States Patent
Lugg

(10) Patent No.: US 8,674,538 B2
(45) Date of Patent: Mar. 18, 2014

(54) SUPERCONDUCTING TURBINE WIND RING GENERATOR

(76) Inventor: Richard H. Lugg, Falmouth, ME (US)

( * ) Notice: Subject to any disclaimer, the term of this patent is extended or adjusted under 35 U.S.C. 154(b) by 647 days.

(21) Appl. No.: 12/905,723

(22) Filed: Oct. 15, 2010

(65) Prior Publication Data

US 2011/0031760 A1 Feb. 10, 2011

Related U.S. Application Data

(63) Continuation-in-part of application No. PCT/US2009/040667, filed on Apr. 15, 2009.

(60) Provisional application No. 61/045,037, filed on Apr. 15, 2008.

(51) Int. Cl.
*F03D 11/00* (2006.01)

(52) U.S. Cl.
USPC .............................................. 290/55; 290/44

(58) Field of Classification Search
USPC ......................................... 290/43, 44, 54, 55
See application file for complete search history.

(56) References Cited

U.S. PATENT DOCUMENTS

| | | | | |
|---|---|---|---|---|
| 1,334,485 A | * | 3/1920 | Clipfell et al. ................ | 290/55 |
| 4,289,970 A | * | 9/1981 | Deibert ......................... | 290/44 |
| 4,720,640 A | * | 1/1988 | Anderson et al. .............. | 290/43 |
| 6,064,123 A | * | 5/2000 | Gislason ....................... | 290/55 |
| 6,849,965 B2 | * | 2/2005 | Le Nabour et al. ............. | 290/55 |
| 7,033,139 B2 | | 4/2006 | Wobben | |
| 7,190,087 B2 | * | 3/2007 | Williams ....................... | 290/53 |
| 7,378,750 B2 | * | 5/2008 | Williams ....................... | 290/43 |
| 7,417,334 B2 | * | 8/2008 | Uchiyama ..................... | 290/55 |
| 7,471,009 B2 | * | 12/2008 | Davis et al. .................... | 290/54 |
| 7,964,978 B1 | * | 6/2011 | Weissmann .................... | 290/44 |
| 8,109,727 B2 | * | 2/2012 | Barber .................... | 416/132 B |
| 8,164,212 B2 | * | 4/2012 | Barber .......................... | 290/55 |
| 2004/0160063 A1 | * | 8/2004 | Le Nabour et al. ............. | 290/55 |
| 2005/0082839 A1 | | 4/2005 | McCoin | |
| 2008/0007070 A1 | | 1/2008 | Edelson | |

FOREIGN PATENT DOCUMENTS

WO 99/37912 A1 7/1999
WO 2009/129309 A2 10/2009

OTHER PUBLICATIONS

Notification of Transmittal of the International Search Report and the Written Opinion dated Feb. 5, 2010 for International Application No. PCT/US2009/040667, filed on Apr. 15, 2009.

* cited by examiner

*Primary Examiner* — Nicholas Ponomarenko
(74) *Attorney, Agent, or Firm* — Verrill Dana, LLP; Chris A. Caseiro

(57) ABSTRACT

A wind generator is disclosed in which superconducting ring generators are utilized without the need for a load bearing drive shaft and other mechanical components, decreasing overall weight and enabling the use of variable geometry blades for increased overall efficiency.

17 Claims, 15 Drawing Sheets

FIG. 2

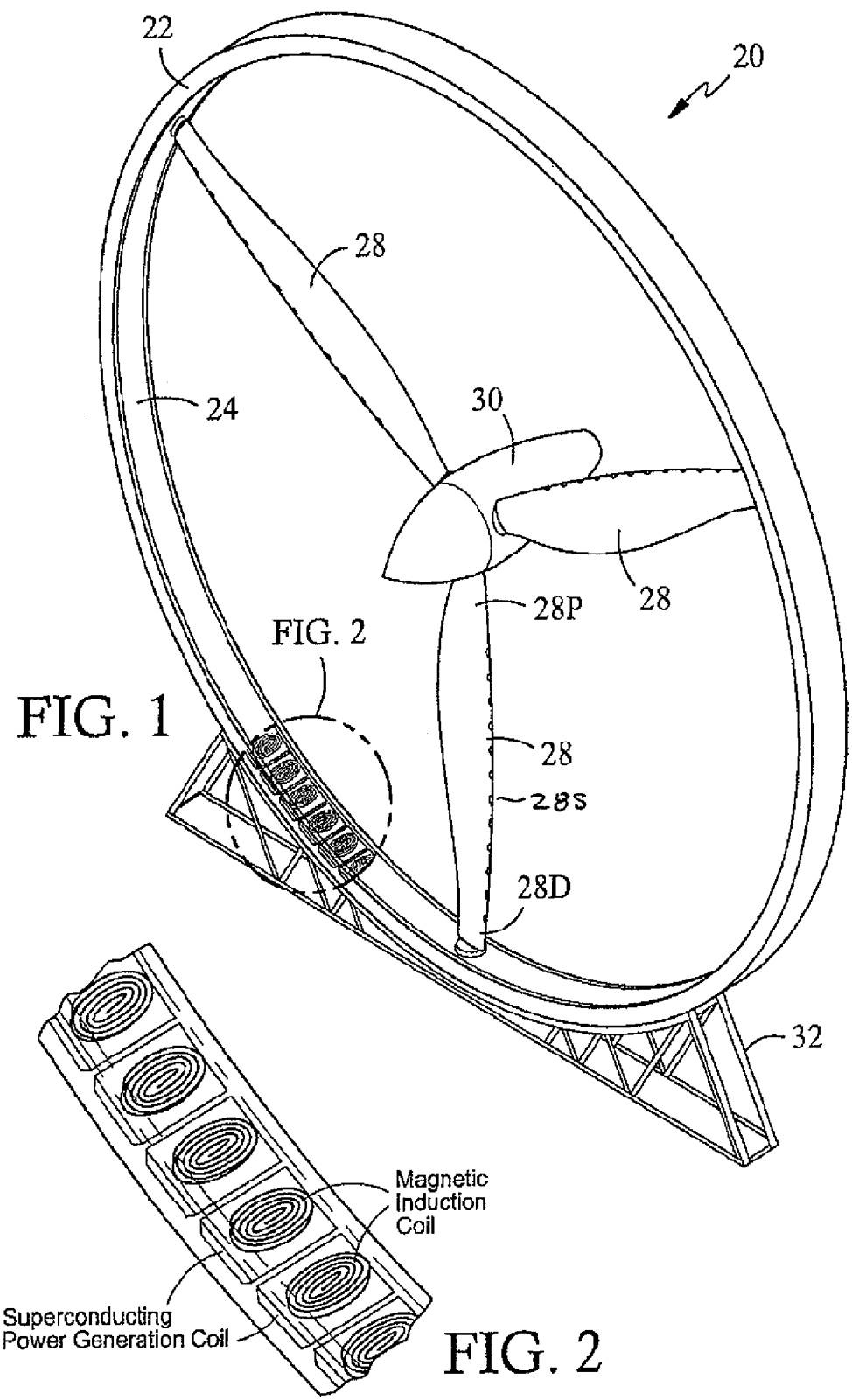

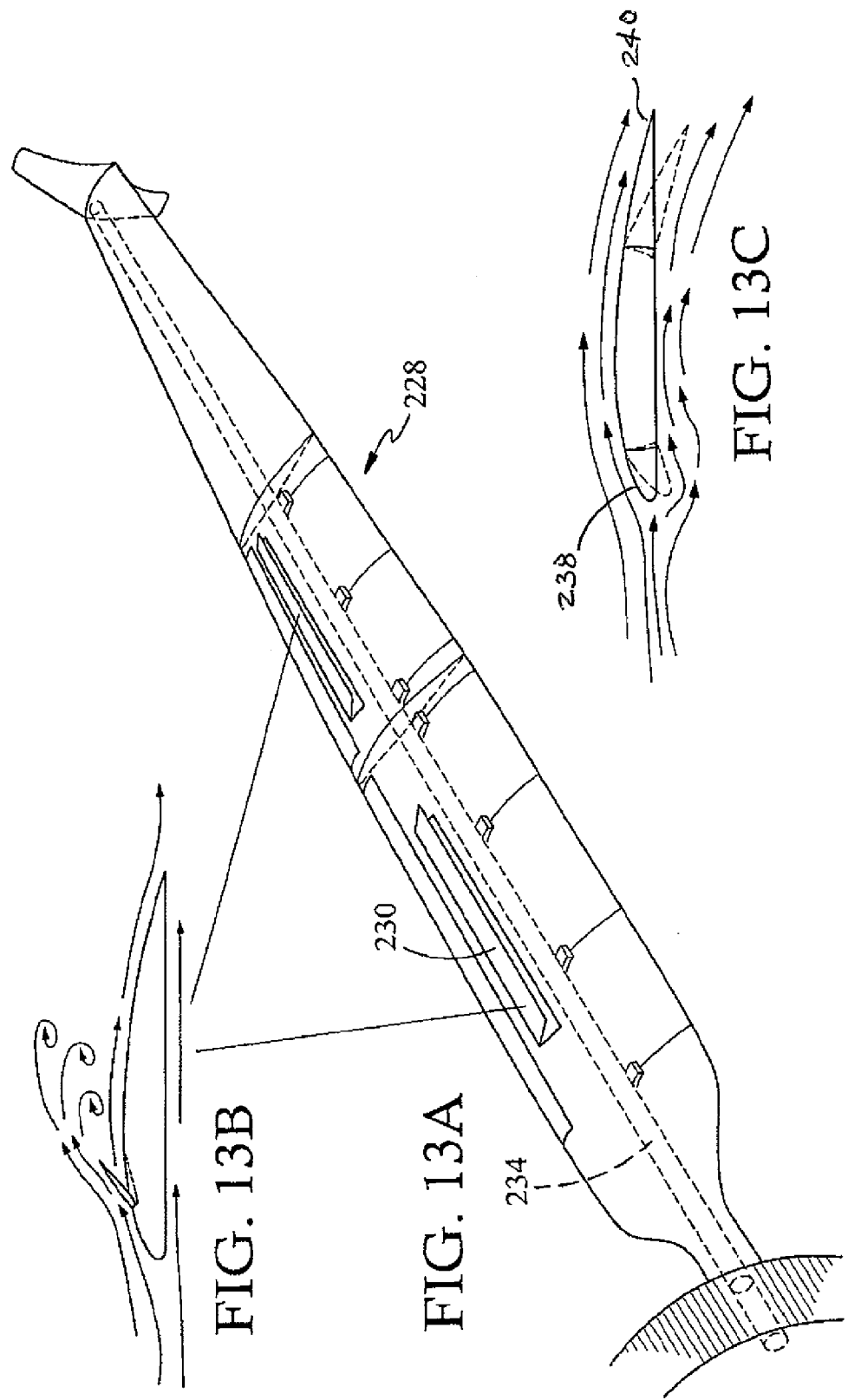

SUPERCONDUCTING TURBINE WIND RING GENERATOR

CROSS REFERENCE TO RELATED APPLICATIONS

This application is a continuation-in-part of co-pending International Application No. PCT/US09/40667 filed Apr. 15, 2009 and entitled SUPERCONDUCTING TURBINE WIND RING GENERATOR, which in turn claims priority to U.S. Provisional Application Ser. No. 61/045,037 filed Apr. 15, 2008, both of which are incorporated by reference herein in their entirety for all purposes.

BACKGROUND

This invention relates to a wind power generation system that includes a series of high temperature superconducting (HTS) coils and a direct drive turbine ring generator system.

Air moving relative to the surface of the earth, with an air mass or air load, holds kinetic energy. To extract that energy, a specific arrangement of turbine rotors or blades is required to generate electric power from the kinetic energy inherently stored in wind. Wind energy is defined herein as a moving molecular mass of air, O2, made up of air molecules and traveling at a specific velocity and having a kinetic energy of alpha=@.

Current wind generation turbines are predominantly limited in overall design and performance by mechanical, material, aerodynamic and physical laws. The current art is further limited by design constraints of essentially four elements of the current wind generator design. These four constraint elements include the hub/drive shaft mechanism, the gearbox mechanical design, the wind generator rotor blades, and the turbine generator. In current wind turbine design, these four constraining elements are typically mounted and centered on a load bearing drive shaft that connects the generator, on the rearward portion of the drive shaft, through a gear box and into a hub, with the blades coming out tangentially therefrom. With current art, typically three blades are used to provide the necessary power to rotate the power generating equipment.

A mass airflow approaches the turbine rotor airfoils or blades at atmospheric pressure and ambient temperature for a given wind site with velocities in the range of 40 to 95 feet/second. Upon striking the wind generator airfoil shaped blades at a constant velocity this air mass creates a tangential velocity and force vector that drives the blades rotationally. The direction of rotation is equal and opposite to, the lower-pressure higher-velocity air traveling along the top of the convex airfoil shape blade, compared to the mass airflow traveling at a lower-velocity higher-pressure air traveling along the flat bottom of the airfoil shape.

The blade(s) may be designed to carry the swept area mass load of air flow against the blade(s). The Performance Power Coefficient, Cp, is the ratio of the power in the rotor compared to the power in the wind. Cp is based on the stream tube concept for a mass of air approaching the blades by evaluating the power in the wind, and the extraction of that power from the wind by impacting on the rotating blade mass. The rotor, as it is moved by the airfoils, extracts this power. However, there are significant kinetic energy losses due to turbulent losses at the airfoil. In particular, turbulence and a wake vortex which comes off the tips of the airfoils are among the largest losses of the airfoil blade system. The stream tube of the air mass expands in volume behind the turbine rotor blades as the mass of air is slowed in velocity, resulting in a volume increase. The degree to which the air is slowed by the rotor, as compared to free stream air is termed the axial induction factor. This factor is represented by the mathematical equation below:

$$a = \frac{U1 - U2}{U1}$$

where "a" is the axial induction factor, "U1" is the wind speed far away from the rotor, "U2" is the wind speed at the rotor. Due to the Law of Conservation of Mass, the air that passes through the rotor does not slow down, therefore a pressure drop across the airfoils is observed and an increase in the volume of air occur, as it expands, as the energy is extracted from the wind by the pressure drop. The air behind the turbine rotor is at sub-atmospheric pressure, the air in front of the turbine rotor is at a pressure higher than atmospheric pressure. The higher pressure in front of the turbine is what deflects some of the air around the turbine.

The maximum coefficient of power is the ability of a wind turbine to extract kinetic energy from the mass air flow across the turbine rotor and is defined by the Betz Limit. The Betz Limit is a function of the Law of Conservation of [Axial] Momentum whereby the wind turbine applies a thrust force on the mass air flow (otherwise the Law of Conservation of Energy would be violated) and consequently the pressure difference between the front to the back of the turbine rotor causes the thrust force that causes the rotation of the blades. The second element of the Betz Limit is the Law of Conservation of Mass and is used to relate to the incoming air to the rotor and the out going air from the rotor. Velocities of the far field flow and near field flow are solved according to the Conservation of Mass and as previously described, the conservation of axial momentum which defines the axial induction factor for the far field flow, the velocities of these flows, and are described in the equations below:

$$U2 = U1(1-a)$$

$$U4 = U1(1-2a)$$

"U4" is the wind velocity of the far wind wake. The ability of a wind turbine to extract energy from the wind is defined further by the Coefficient of Power, or Cp, which is also an element of the Betz Limit, this being the derivative of the formula for Power. The formulas for these power definitions are below:

$$\text{Power} = P = 0.5 \, pAU2(U2 - U4/2)$$

$$\text{Coefficient of Power} = Cp = P/0.5 \, pAU1/3$$

The Betz Limit is defined by the maximum value of the formula for "Cp", whereby the respective velocity relations (near field and far field) are put into the Power formula, and these substituted into the Coefficient of Power formula and is expressed in the equation:

$$Cp = 4a(1-a)2$$

Currently, wind generator systems have a maximum Betz limit of approximately 59.25%. This is basically the maximum efficiency of power extracted from the turbine rotor due to the manifestation of the differing velocities of near field and far field flows, and the differential pressures created by these flows in front of the turbine and behind the turbine.

Thus, it would be advantageous to develop wind generating systems that are able to provide improved efficiency.

SUMMARY

According to one aspect the invention a wind turbine ring generator comprises a stationary, ring-shaped stator; and a ring-shaped rotor concentrically disposed relative to the ring-shaped stator about a common axis and separated therefrom, the ring-shaped rotor having an interior diameter and at least one rotor blade extending across a portion of the interior diameter and attached to the ring-shaped rotor so that rotor blade and ring-shaped rotor move in unison relative to the ring-shaped stator.

According to the second aspect of the invention, a wind turbine apparatus comprises: a shroud at least partially surrounding one or more of a plurality of wind turbine ring generators, the wind turbine ring generators comprising: a stationary, ring shaped stator, a ring-shaped rotor concentrically disposed relative to the ring-shaped stator, and separated therefrom, the ring-shaped rotor having an interior diameter and at least one rotor blade extending across a portion of the interior diameter and attached to the ring-shaped rotor so that rotor blade and ring-shaped rotor move in unison relative to the ring-shaped stator.

According to third aspect of the invention, a wind turbine apparatus comprises: a stationary, ring-shaped stator, a ring-shaped rotor concentrically disposed relative to the ring-shaped stator and separated therefrom, a plurality of rotor blades operatively coupled to the ring-shaped rotor and extending radially outboard therefrom so that rotor blades and ring-shaped rotor move in unison relative to the ring-shaped stator.

According to a fourth aspect of the invention, a wind turbine apparatus comprises: a plurality of rotor blades having one end operatively and movably attached to a common mechanism wherein at least two of the rotor blades simultaneously have different pitch relative to the common axis.

According to a fifth aspect of the invention, a rotor blade apparatus comprises: a rotor blade having a cross-sectional profile defining a perimeter shape; and a mechanism operatively coupled to the rotor blade for selectively manipulating the perimeter shape of the cross-sectional profile to modify the aerodynamic characteristics of the rotor blade.

BRIEF DESCRIPTION OF THE DRAWINGS

The above and further advantages of the invention may be better understood by referring to the following description in conjunction with the accompanying drawings in which:

FIG. 1 is a perspective view of a ring turbine generator in accordance with a first disclosed embodiment;

FIG. 2 is a partial cutaway view of a portion of the moving inner ring and outer station ring of the generator illustrated in FIG. 1;

FIG. 13A-C are perspective and cutaway views of a rotor blade or airfoil having a manipulatable shape.

DESCRIPTION OF EXEMPLARY EMBODIMENTS

Figure 3:
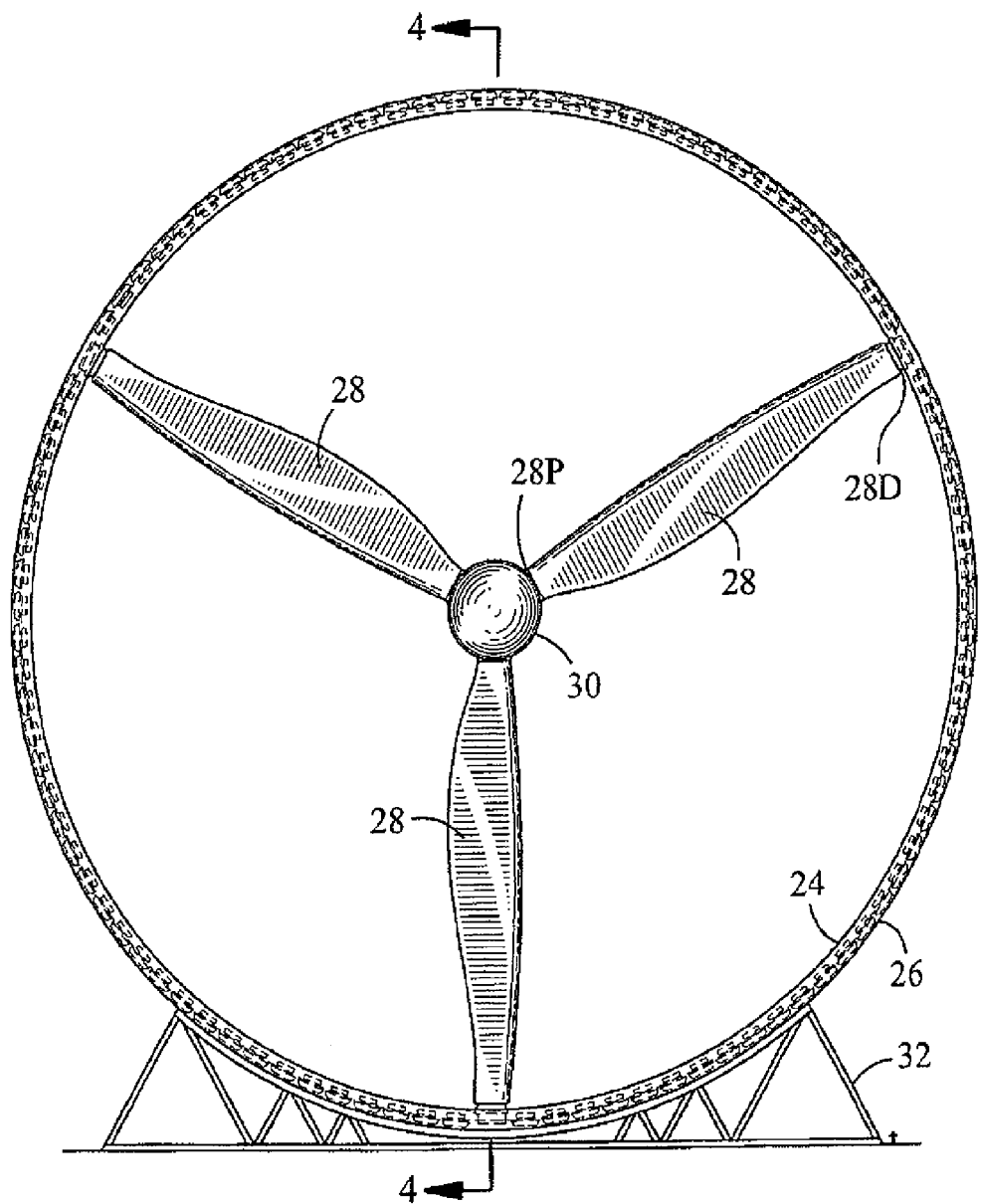
FIG. 3 is a front view of the turbine generator of FIG. 1 with relationship coils within the inner and outer rings illustrated in phantom.

Disclosed is a wind powered generating system having high temperature superconducting (HTS) coils, a magnetic levitation air bearing system, a shrouded or non-shrouded rotor system, and a direct drive system whereby an electric turbine ring generator system is driven directly by the plurality of airfoil blades.

FIGS. 1-8 illustrate a first exemplary embodiment of a wind ring superconducting turbine generator 20 comprises a shroud 22, rotating inner ring 24, and outer stationery ring 26 and supports 32. Within the generator 20, inner ring 24 and outer ring 26 are positioned concentrically, with inner ring 24 constituting the rotating component (the rotor) which, when in motion, is maintained in plane with stationary outer ring 26 (the stator) by magnetic levitation. Both rings 24 and 26 may be made from advanced materials, such as lightweight aluminum and titanium metal alloys, and carbon fiber reinforced plastic. The rotating inner ring 24 further comprises rotor blades 28 running medially inward toward hub 30, an inner-perimeter structure that serves to join the medial ends of the rotor blades 28. As illustrated in FIG. 1, the rotor blades 28 are attached at respective blade ends 28P to the concentric hub 30 while blades 28 are attached at respective blade ends 28D to the inner perimeter inner ring 24. In the illustrative first embodiment, rotor blades 28 and the perimeter structure of inner ring 24 may comprise a single integrated rotating component.

In the illustrative embodiment, shroud 22 maybe coextensive with outer stationery ring 26 or may comprise additional exterior structures positioned about the fixed outer ring 26 (stator). The stationary outer ring 26 (stator) houses the superconducting induction coils 34, the magnetic levitation coils 36, while the rotating inner ring (rotor) houses the permanent magnet drive 38, Halbach Arrays 40 and levitation coils 42. Collectively, the various coils, magnets and the Halbach Arrays interact to produce an electromagnetic force and flux between the inner and outer rings as the rotor is rotated due to airflow impingement of a mass airflow tangent to the blades 28 (airfoils) at varying wind speeds. Thus, the disclosed embodiment may generate electricity as a turbine ring generator in wind generation applications at a wide variety of wind speeds. Additionally, since the HTS coils 34 are disposed on outer ring 26 (stator), the blades 28 or airfoils may be attached as described herein, and, therefore, can drive the inner ring 24 (rotor) without the need of for a drive shaft and gear box.

The near field wind crossing the wind turbine ring generator 20 encounters the blades 28 and the shroud 22. The shroud 22 from its leading edge to its trailing edge generates a laminar air flow by its airfoil shape and configuration and creates a pressure drop across the swept area of the ring turbine blades 28. This forms a differential pressure in the near field flow that is larger when compared to the far field flow. This differential is greater as compared to the near field and far field flow differentials in the current art of wind generator technology. Thus in the first embodiment, the use of the shroud 22 fundamentally alters the respective velocity relations in the power formula, and in turn raises the differential between the pressures of the near and far field flows, hence raising the Betz Limit to a new level. In addition, in this embodiment, the usual vorticies of turbulent flow off of the blade tips do not exist as the blade tips junction into the electromagnetic permanent magnet trunion of the outer structural surface of the inner ring 24. Removal of the of turbulent flow, as well as related eddy currents, further impacts the velocity and pressure differential across the swept blade area of the ring turbine and thus the differential of these variables as they relate to the near and far field flows further impacting the power equation outcome and thus raising the difference between near field and far field flows in the Coefficient of Power Formula, subsequently raising power efficiency further. Current wind generator designs have vortex and eddy current disturbances at the blade tips as they rotate out in free space, attached only at the root of the blade to the hub, thus lowering their efficiency.

The first embodiment may also utilize a ring generator of large size (75' to 500' diameter) and is a direct drive system. Electromagnetics and switching speed are governed by coil size, power density and surface area, wherein the larger surface area of the ring generator, simply by its geometry, is able to move the rotor at a sufficiently high speed even in lower velocity air and thus a gear box is not needed to raise the speed of generation. In addition, as compared to current art, power coil density to a given surface area can be increased due to the open configuration of the ring. The circumference of the ring as compared to the axial depth of the ring raises the electromagnetic power density ratio between coil count, power flux switching, surface area, and geometry more so than ever as compared to current art generators which are of single shaft stator and rotor designs. In addition, the use superconducting electromagnetics raises the energy density of the generator by bringing the electric resistance to zero, this has not been done before in a superconducting ring generator design for wind generation and is novel to the invention. With zero electrical resistance in operating at high cryogenic temperatures (64K-110K) with superconducting coils, power generation capacity and electrical density can be raised to 3.0-5.0 times higher than copper coiled designs in current art.

Near field mass air flow can be manipulated in the first embodiment with the use of the shroud 22 around the turbine outer ring 26 (stator), creating laminar flow at the blade tips 28D without a vortex of air flow, and raising blade kinetic energy extraction efficiency by as much as 40%. The junction and transition to the outer outer ring is smooth, there is no airflow spillage, thus reducing drag, generating laminar flow instead of turbulent flow at the turbine blade tips. Hence, this raises the velocity of the near field flow, thus effectively raising the power efficiency U2, and raising the Betz Limit factor above 59.25%, although based on preliminary calculations the limit could be raised to 65%-70%.

In the first embodiment, differential pressure is also raised between the front and back with accordingly a reduction in pressure drop and an increase in flow velocity. This has an increase in the thrust force upon the turbine rotor which is a component of the axial induction factor and the conservation of momentum law is conserved, therefore less momentum is lost of the kinetic energy extracted from the wind by the turbine rotor, hence efficiency is raised, as compared to current art. This has a direct impact on the Power Efficiency equation and results in a new power efficiency limit. This allows the first embodiment to operate at higher relative velocities and turbine rotor speeds than current art because of the shroud around the outer stator ring, which generates higher energy efficiencies for the superconducting electromagnetics due to the higher pressure and velocity differentials between near field and far field flow. Because of this, revolutions per minute (RPM) of the rotor can be raised also increasing generation efficiency. The concurrent pressure drop across the turbine rotor which is described as the axial induction factor is also reduced in value. As discussed above, the Betz limit is further defined by the equation of coefficient of power in terms of the induction factor. With near and far field velocities now holding a greater differential due to the invention of an aerodynamically shrouded turbine ring generator design this effects the velocity relations being substituted (near field and far field) in the power equation, and this substituted into the coefficient of power equation. Consequently the coefficient of power formula for the new invention accommodates a greater velocity differential from which it is derived from, and when taking the derivative of this equation in respect to the axial induction factor (which is a lower factor in the invention compared to current art) setting it to zero it is shown that the optimal axial induction factor is less than one-third, thus raising the Betz Limit beyond the value of 59.25%, to a limit potentially of 65.0% or even as high as 70%.

In the present teachings, the HTS coils offer 3-5 times the power density and flux magnitudes and strengths when compared to current copper coils, and therefore can be operated at very low rotational speeds through advanced silicone carbide switching technologies. Thus, the losses of magnetic field decay due to low rotational speeds are avoided because of the large magnetic field densities present by the HTS coils, and by utilizing silicone carbide magnetic switching capacity of the in-plane magnetic field strengths, these advanced silicone carbide switching technologies utilized in wind generators, and particularly superconducting ring generators is unique and novel to the invention and has not been done before. Additionally, due to the large axial length of the ring generator configuration, both in the shrouded first embodiment, and in a un-shrouded second embodiment, the surface area of the HTS magnetic coil designs may be increased, as they may be configured as a flat "pancake" loop geometry rather than in cylinders. This incorporates a larger magnetic flux decay time gap, as the HTS coil loops would overlap incrementally to reduce the coil rate decay which is formed by the sine wave waves forms, formed between the coil gaps, and that the decay rate may be more precisely controlled by the overlap geometry and flat loop coil configuration, and the electromagnetic decay thus is slowed. The electrical switching mechanism of the silicone carbide switches between the coils essentially allows for the current to be stored in the silicone carbide switch momentarily as it decays (the decay rate speed is or half life is reduced), without generating heat, which would result in a loss of electrical power and would result in a lower efficiency. The switch controls the phase of the sine wave present between the flux in the induced HTS coil magnetic field and the existing sine wave generated by the permanent magnets rotating past the HTS generation coils, the goal being to make the sine waves substantially in-phase or synchronous in this direct current (DC) machine. The switch additionally allows for the sine wave to be sustained, or reduces the decay rate time gap, and is more capable of it with the pancake loop HTS coil geometry and the coils over lapping reducing the physical gap distance between the coils. This allows high power densities to be achieved in generation with the HTS coils, at low-speeds using the robust, energy saving, silicone carbide switching technology in this direct drive configuration as the decay rate of the magnetic flux is marginalized (more of the created power is maintained and pulled off the generator for electricity because of the silicone carbide switching technology, HTS coil geometry and incremental coil overlaps.

In the first embodiment, the configuration of the rotor and stator assembly is such that the axial length of the ring is significant as compared to its diameter. This diameter to axial length ratio is therefore low, i.e., the length and diameter are similar in length. This configuration provides a very large surface area on which to dispose the HTS coils. This distributes the magnetic flux generated by the permanent magnets of the rotor moving past the HTS coils over a large surface area as compared to traditional copper coil generators in the current art. The configuration of the embodiment, the HTS, direct drive, turbine ring generator, therefore geometrically optimizes magnetic flux and raises the power density above traditional values of current art, thus creating a 3-5 times increase or more in power generation capacity for each turbine of the invention put into operation to generate electricity. Increased efficiencies in electric power generation also are because of the array of the HTS coils oriented along the large surface area of the axial length of the stator. The HTS coils are in close proximity to the rotating permanent magnets and in low speed ranges (10-15 rpm) at 45-55 Hz, because of the possible use of innovative geometric shapes for the coil configuration, in the embodiments described herein the geometric shapes are a pancake like-loop shaped configuration that may be stacked vertically.

This embodiment may also increase the power generation efficiency by using more than three blades to optimize the extraction of kinetic energy from wind at higher rotational speeds. Additionally, the shrouded design of the ring generator increases velocity of mass airflow, and hence the velocity at which kinetic energy is withdrawn from the air flow mass, although as discussed above, there is a pressure drop across the swept area of the rotor due to the conservation of energy, but this does not reduce the efficiency improvements when measured against kinetic energy extraction from mass air flow velocities in un-shrouded wind generator designs. Moreover, the use of high temperature superconducting electromagnetics in conjunction with the direct drive configuration of the ring generator allows for the optimization and control of the synchronaity of the sine wave forms at both high speed frequencies and low speed frequencies. In these embodiments of the HTS direct drive wind turbine ring generator, both shrouded and un-shrouded embodiments described herein, the low speed electric generation frequencies are important because the low speed frequency of operation of the invention coincides with lower wind speeds and the larger areas of land mass of all continents which have these low wind speeds. For example, Class I and Class II wind, which are wind speeds below 15 MPH, are a class of wind speed that in the United States and Europe predominates land masses, and other continents as well. Therefore the invention and configuration may generate power where current wind generators can not and in addition, offers a solution to provide more consistent electric power without the generation spikes observed in current art when the wind speed drops. Lower wind speeds may be used to generate power in the disclosed embodiments herein as the rotational inertia and mechanical losses are removed nor does either embodiment include drive shaft as compared to current wind generators. The substantial reduction or removal of these losses also provides additional frequency stability at the low generation frequencies (45 Hz) and at the high frequencies (90 Hz) which is an improvement over the frequency stability of conventional shafted, gearbox wind generator designs using copper coil technology. The higher the rotational speed and the tangential vectors of the machine the greater the power efficiency, or "theta Θ" as it relates to the derivative of the kinetic energy alpha=å in the wind. At lower rotational speed and lower tangential velocities, harmonics are more stable due to the direct drive, magnetic losses are stabilized and more accurately controlled (reduction of the flux decay rate) by the silicone carbide switching technology. The structural robustness of the design is also improved by higher structural strength, reduced harmonics, and the integrated system of the direct drive design (no gearbox, no drive shaft, no mechanical bearings). By housing the rotor, stator, and airfoils inside an aerodynamic shroud generation efficiency can be improved by over 35%. In addition, as discussed above, the rotor is magnetically levitated on an air bearing which is maintained between the stator and rotor by a series of Halbach Arrays and levitation coils using neodinium iron-boron permanent magnets to provide the repulsion forces for the magnetic levitation air-bearing. This allows for an increase in power efficiency due to a nearly complete lack of drag on the rotor and furthermore due to the finite control of the structural harmonics and the reduction of the vibrational inefficiencies that traditionally disturbs power efficiency in conventional wind generators. The impact of superconducting electromagnetics implemented in a HTS ring turbine wind generator architecture brings electrical resistance to substantially zero, this raises power density per cubic centimeter (cm3) or generation capacity per megawatt hour 3 to 5 times conventional copper coiled induction/generation coil designs, or even more, as compared to current art, and can directly effects the Betz Limit. These various systems in this embodiment, i.e., the invention in its shrouded form has aerodynamic, generation, and mechanical efficiencies that may increase the efficiency of the Betz Limit to at least 65.0%.

In an exemplary implementation of the first embodiment, a 70.0' (seventy foot diameter) aerodynamic shroud housing a first stage 25' (twenty five feet diameter) diameter turbine wind ring superconducting generator delivers approximately 34.4 MW and 46,179 SHP at 50 RPM, and provides a continuous torque per unit active mass of at least 7.50 Newton-meters/lb. and a torque per unit volume of at least 8500 Nm/m3 while extracting the kinetic energy from a moving wind mass of 30 mph at an altitude rage of 0-400 feet.

Figures 4, 5:
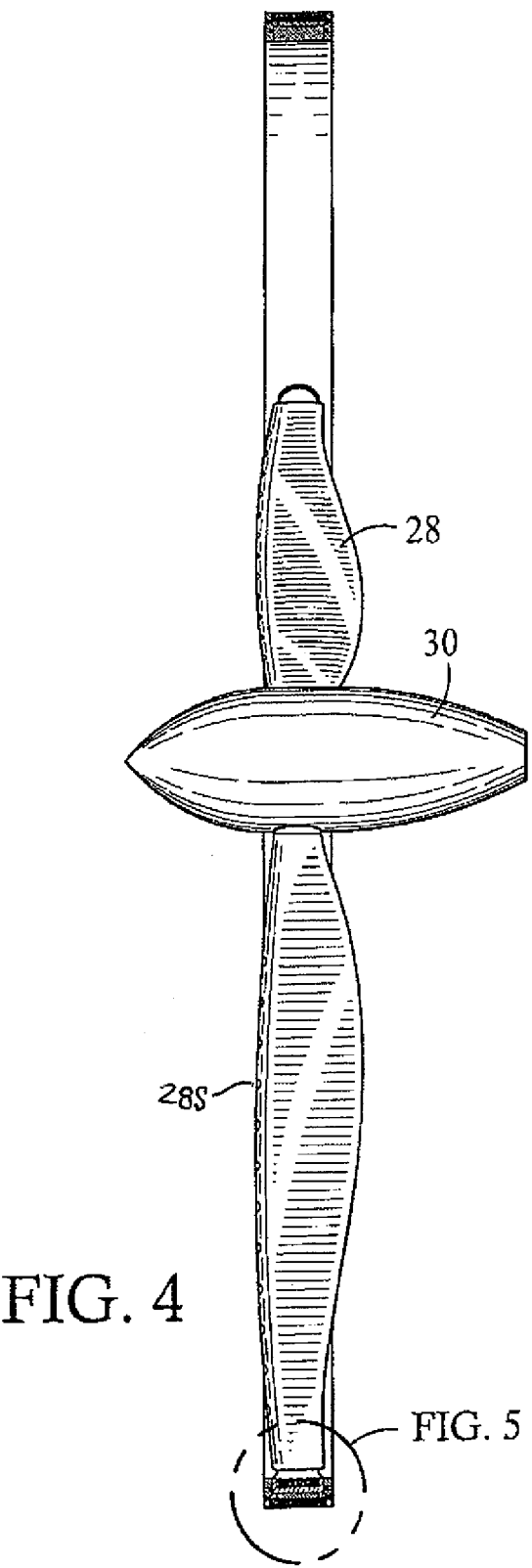
FIG. 4 is a side partially cutaway view of the generator of FIG. 3 taken along line 4-4.
FIG. 5 is a partially cutaway view of the relationship of inner and outer rings of the generator of FIG. 4 illustrating the relationship of the rings and constituent components contained therein.
Figure 5:
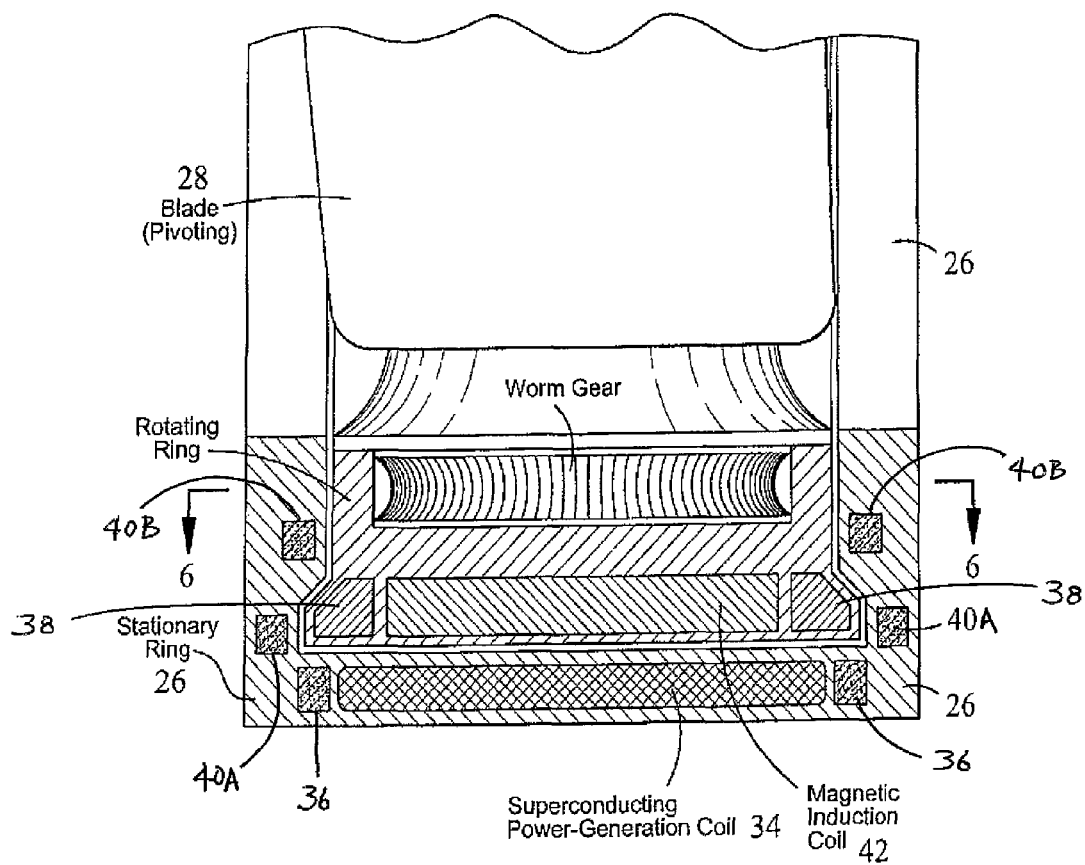

With reference to FIG. 5, an actively cooled radial channel thermal barrier removes heat from the edge of the rotor structure. In one aspect of this embodiment, a zig-zag channel which offers large surface area of cooling between the inner surface of an advanced composite thermal barrier (aerogel advanced composite) and the other metallic surface(s) of the rotor to which the rotor blades are attached. The integrated aerogel thermal barrier is positioned between the Halbach Array induction coils 40A and the channel section of the superconducting generator coils 34, and the permanent magnets 40B utilized to generate the repulsive forces for the magnetic levitation system.

The actively cooled radial channel thermal barrier is connected to a radiator in the cold stator ring housing the HTS power generation coils. The cryogenic fluid is pumped (liquid nitrogen) between the channels internal to the stator ring duct and the radial channel thermal barrier. An integrated cryopump in the system circulates the fluid. Superconducting stator generator coils generate electric power by the permanent magnets in the outer rim spinning at a designated operational speed in close proximity to the superconducting coils thereby inducing an electrical current in the superconducting coils which is transmitted to the utility grid. Due to the nature of superconducting power, the turbine wind ring generator has the capacity to deliver more than 5 times the amount of power in three quarters (75%) of the size as compared to current wind generator art. Additionally, electric power is transported with zero electric resistance at operational temperatures between 64K-77K utilizing what is termed 2G superconducting tape in the coil designs.

A RingGap Radiative Cooling System (RRCS) similar to that illustrated in FIG. 13 may be positioned in the stator that will cool the surface of the permanent magnets in the rotor above the stator which is novel to the invention in both embodiments and has not been done before. The RingGap contains pumped cooling fluid (silicone based) to cool a metal plate situated above the induction superconducting coils and below the rotating rotor with the permanent magnets in it. The circumference of the inner ring (the rotor), which also houses the cantilevered airfoil rotor blades, contains the permanent magnets that generate the magnetic field to induce current in the superconducting coils in the outer ring (stator). The outer ring (the stator) holds the generators cryogenically cooled, high-power, superconducting coils, and also holds the levitating and positioning Halbach Arrays (consisting of neodymium-iron-boron permanent magnets).

A cryogenic cooling system provides coolant (liquid nitrogen) to the superconducting electromagnets in the outer ring; and the outer ring is surrounded by a highly efficient insulating material, such as a silicon carbide aerogel composite. The outer stator as far as a structure is a C-channel rectangle in profile. The surface which faces the spinning rotor has a double guidance channel which serves to position the spinning rotor, which supports the cantilevered rotor blades that extend distally outward into the moving mass air flow) in terms of a structure but with the generated magnetic field of the permanent magnets and Halbach Arrays. The rectangle in cross section of the outer rotor serves as a circumferential pressure vessel housing for the superconducting coils or electromagnets. Due to the cryogen being pumped around the coils, to maintain cryogenic temperatures and the thermal gradient with the outside atmosphere, the coils are hermetically sealed in the box like structure at 6.0 Tarr (six times atmospheric pressure). The outer ring has a mechanically retracting support mechanism that provides rotor support during startup to constrain out-of-plane, in-plane, and shear loads outside of the design criteria of the wind ring generator turbine, and to ameliorate the effects of contact between the rings due to operational anomalies such as foreign object damage (bird strike) and/or sudden cool down from high operating temperatures. The generator is started by the impingement of a moving mass flow of wind at a minimum of 3.0 mph for this design embodiment with the induction of electric generation capacity staring at 6.0 mph. A support mechanism will hold the turbine generator in place during storage and at other times when the turbine generator is not intended to be rotating. In an application of this invention used in conjunction with the technology disclosed in U.S. patent application Ser. No. 11/518,276, the mechanism support is also required for an abrupt stop anomoalie.

Figure 6:
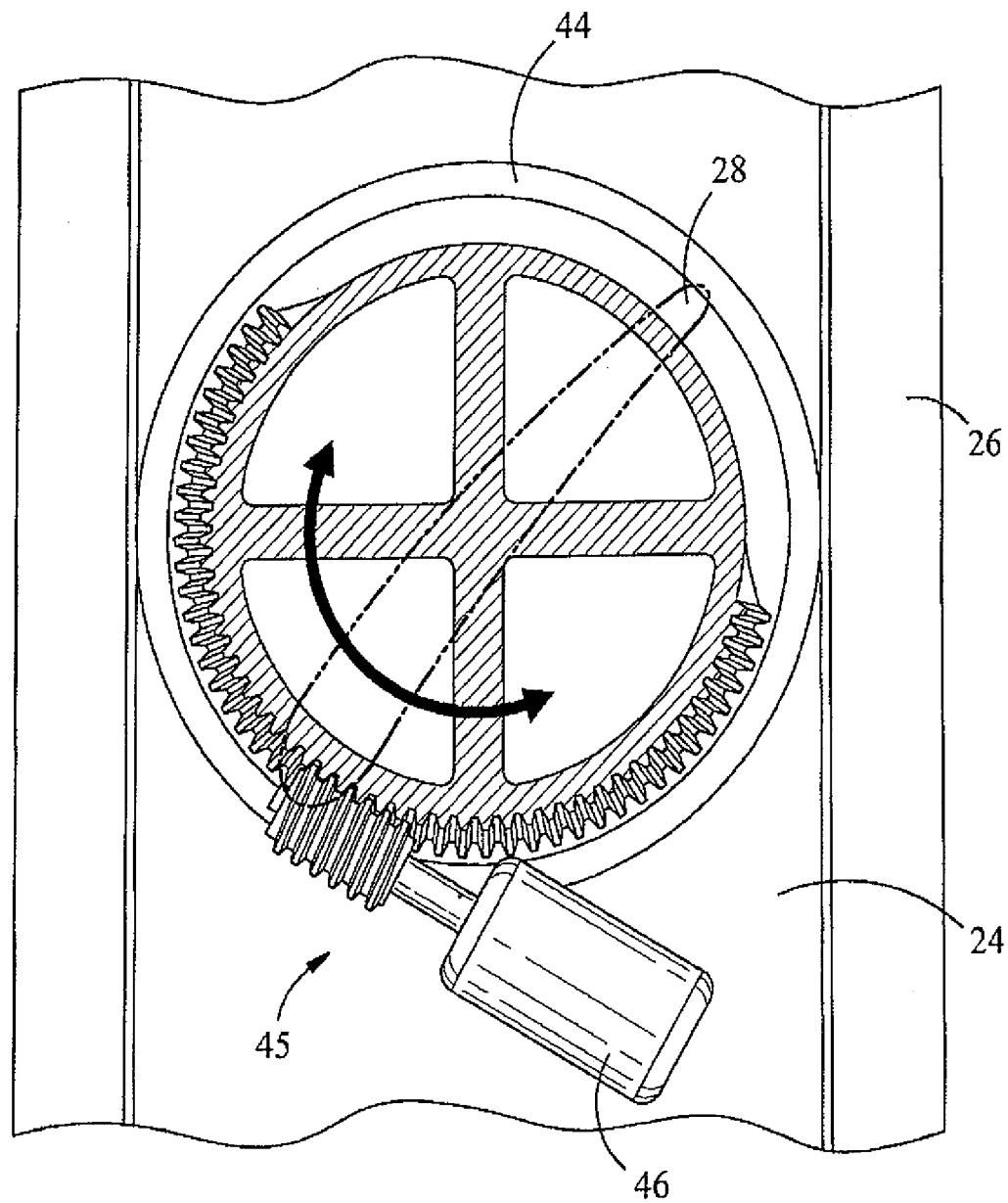
FIG. 6 is a partially cutaway view of the mechanism for separately manipulating the pitch or direction of each of the rotor blades, with an examplary rotor blade illustrated in phantom.

Referring to FIG. 6, a wind ring turbine blade rotor radial feathering mechanism 45, comprising a worm gear 44 and motor 46 arrangement as illustrated and embedded within the inner ring 24, is employed which allows for continuous adjustment of the angle of the turbine rotor blades to the mass air flow front. This controls the tangential velocity, and/or the vector of the wind velocity tangent to the blade and may be adjusted so as to raise the lift profile and reduce the drag profile of each blade, therefore controlling the power generation to the induction coils through variation of operation speed (RPM), and maximizing kinetic energy extraction from the wind. More importantly the angle of the turbine rotor blades may be adjusted such that the free stream of the moving mass air flow across the swept area of the blades within the ring is uninterrupted and drag is reduced to substantially zero as no eddy currents are formed at the interface between the rotor blades and the inner surface of the inner moving rotor ring in the first embodiment and at the outer surface of the outer rotor ring in the second embodiment. In wind generation, the feathering of the ring turbine rotor blades affords control of the air velocity in a duct of the ring generator, thus allowing for maximum extraction of the kinetic energy from the air mass passing through the wind turbine ring generator. Another component of both the first, and second, the embodiment entails the utilization of airfoil lift devices to change the coefficient of drag, Cd, and the coefficient of lift, Ld. The purpose for this component of the current invention is that as the impinging wind mass flow changes in velocity, airfoil profiles of ring generator rotor blades may be morphed or changed in profile to raise the efficiency of extraction of kinetic energy from the mass air flow. Specifically, each rotor blade houses trailing edge flaps, leading edge slats, and reflexed spoilerons to create highly undercambered, or overcambered airfoils which are more efficient in low speed wind conditions, and dependent on the deployment conversion, raises efficiency and reduces high frequency harmonics in high wind speed conditions. Conversely, the range of movement of these lift devices is significant enough where they may be implanted in changing the shape of the airfoil to the point that they can improve kinetic energy extraction of the wind at very high wind speeds. This is novel to the invention, and has not been done before. It has not been done before because the superconducting wind ring turbine generator has the ability to resist induced frequency harmonics in the first embodiment from the actuators (which add additional weight and counter balanced harmonics of the blade, and drive higher mechanical loads) of the rotor lift devices since the rotor airfoil is held at both distal and proximal ends of the blades because of the inner hub ring and outer rotor ring housing the permanent magnets. In the second embodiment, these lift devices are possible because of the dual inner and outer rotor ring design to which the rotor blades are cantilevered from and raise the structural and bending load resistances, and offers a structural spine, or spar, made possible which runs from the central rotor blade shaft at the pitch control mechanism, to the very distal end of the tip of the rotor blade out in free space.

Additionally, the wind ring turbine generator scaled up to a very large size the superconducting wind ring generator is 500 feet in diameter or larger. The larger the superconducting electromagnetics are scaled the more efficient energy generation becomes because it affords that the superconducting ribbon which makes up the coils can be highly optimized as brittleness of the aluminum oxide based metal is not constrained to the smaller radiuses of smaller generation machines when it comes to sizing of the superconducting coils which are made from winding the tape. More importantly, at this scale, the pole which suspends the rotor blades of a wind turbine above the ground can be done away with in the first embodiment (removed as an erection and load bearing structure), the wind ring generation machine is erected in circular sections and stands on the outer stator ring on a concrete foundation attached to the ground to mount the edge of the ring upon. Also at this scale, the superconducting wind ring generator may be incorporated into bridge structures, road ways and buildings, supplying high levels of electric power in these integrated architectural structures. At 500' in diameter, the ring structure has enough size to become a positive influence to large skyscrapers as a load bearing surface as well as an integrated power generation station within the building.

With the ability to change the angle-of-attack in this large 500' diameter size of the wind ring generator, the rotor blades on a large scale affords the rotating blades (of a total of five blades) passing along the bottom of the ring to be at a lower angle-of-attack (AOA) as compared to the blades passing over the top of the ring rotation. Thus the lower wind speeds which are observed close to the ground (below 250' down toward zero elevation) in wind energy farms may be captured, and the higher wind speeds at the higher elevations above 250' and up to 400'-500' may also be captured simultaneously, hence a long and expensive operation to erect a load bearing pole structure is not needed as the wind ring generator is large enough. This is novel and unique to the invention and has not been done before. The feathering of the blades and adjustment to the wind mass flow may be done and optimized continuously every rotation by accelerometers and pressure sensors 28S embedded in the large rotor blades which each may measure 250'+in length, making a total wind ring diameter of 500', in one illustrative embodiment. At that size the superconducting wind ring generator 20 will develop upwards of 231.3 megawatts per installation.

Figure 7A:
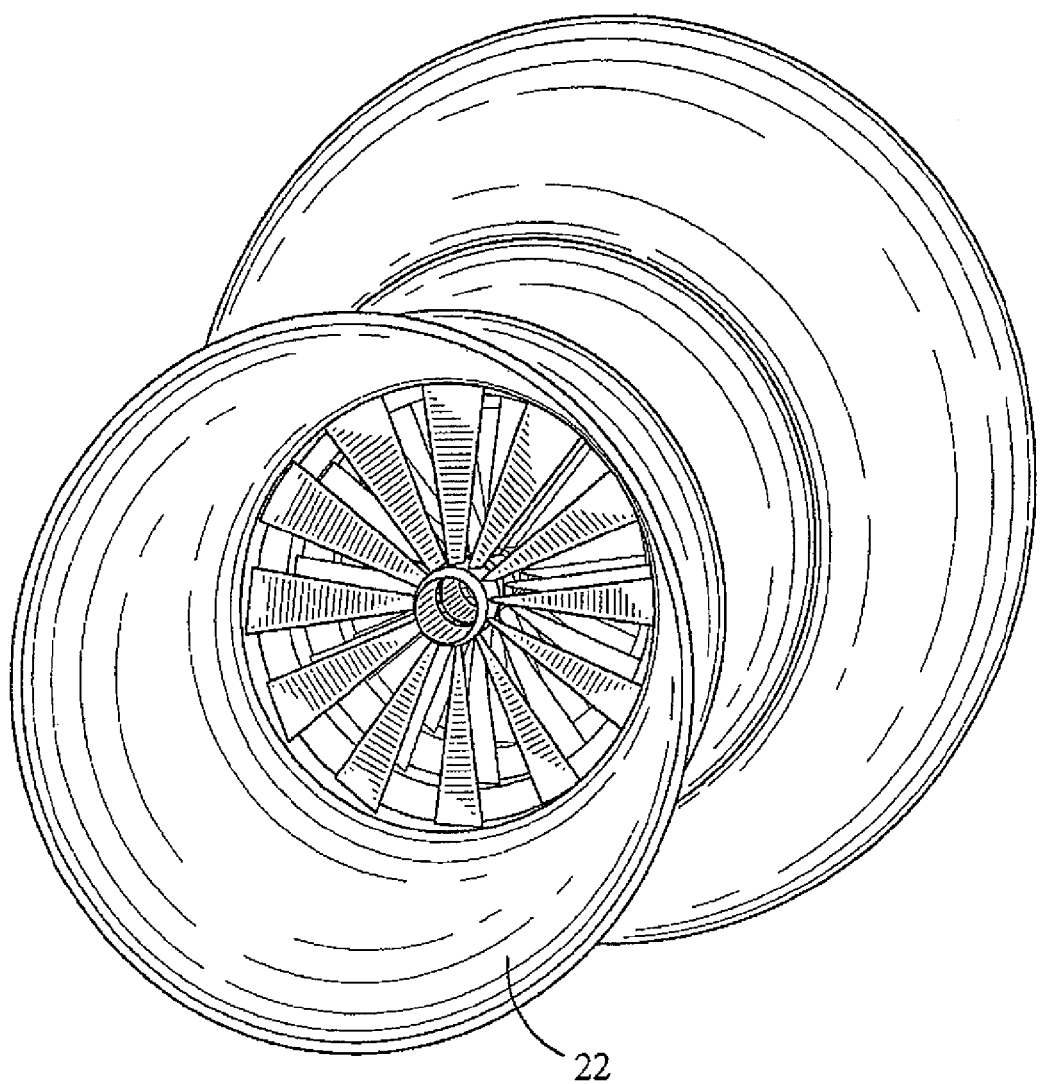
FIG. 7A is a front perspective view of an alternative embodiment comprising multiple ring generators housed within an extended shroud.
Figure 7B:
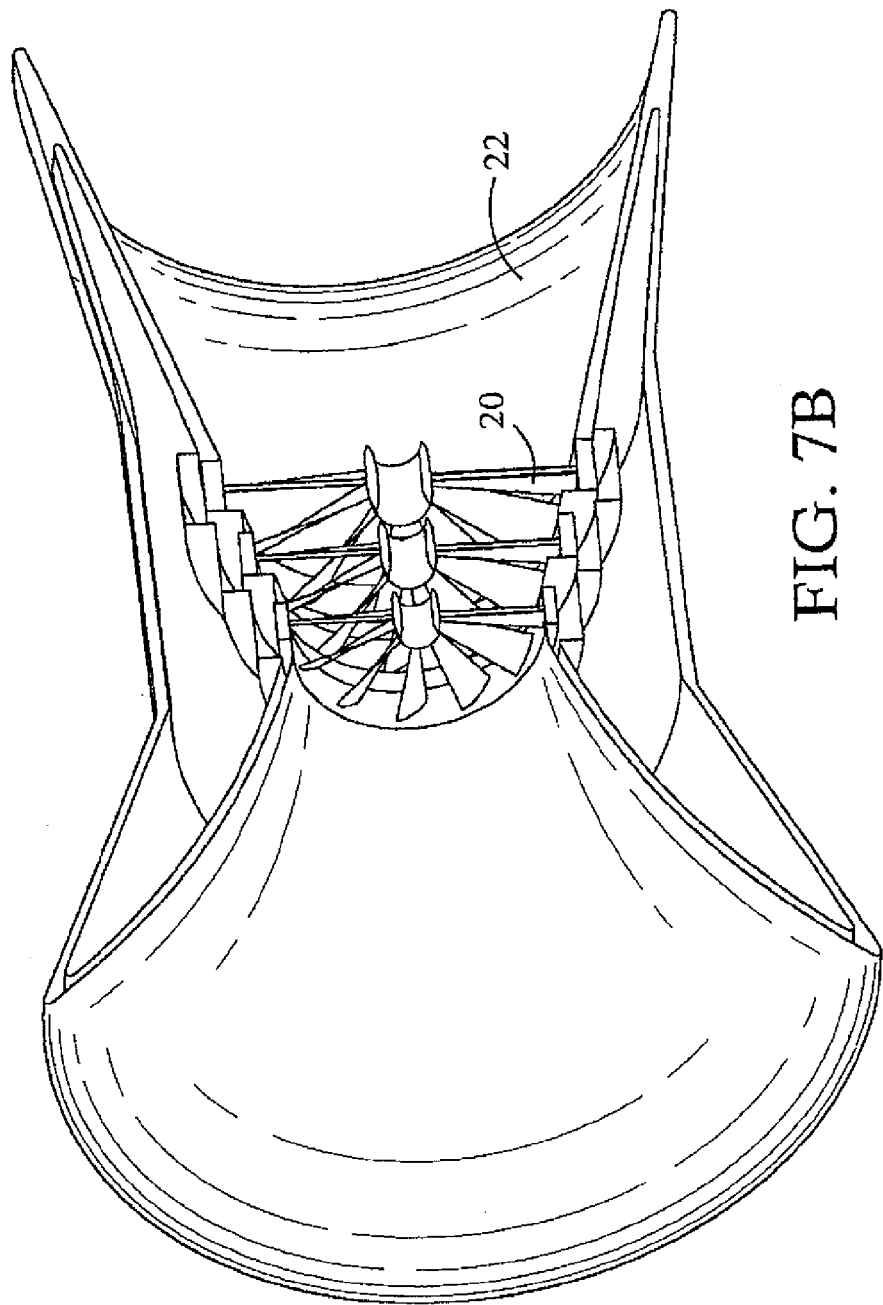
FIG. 7B is a side, partially cutaway view of the embodiment of FIG. 7A comprising multiple ring generators.

In an alternative to the first disclosed embodiment, as illustrated in FIGS. 7A-B, the air mass can then be accelerated via a Venturi effect by an aerodynamically shaped extended shroud 22 housing a multitude of ring generator turbines 20 in series, of sized geometry and power of the application, where more work, or higher kinetic energy extraction is accomplished, and thus high electrical power generation may be achieved. The Venturi Effect applies in the case of air flow through a tube or pipe with a constriction in it. The air speeds up in the constriction, reducing its pressure and producing a partial vacuum. In essence with the wind generation applications, the kinetic energy of the mass flow is utilized more efficiently because it is ducted in an aerodynamic ring configuration and sequentially oriented, wherein the ring generators are staged one behind the other. Instead of a free wheeling propeller attached to a single generator with a drive shaft for the armature (stator) and rotor as found in the current state of the art of wind generation, the superconducting ring generator described herein has the ability to increase power generation capacity by as much as five times the amount of current state-of-the-art in wind energy generators. This is achieved through a number of technology and design factors which are: (1) The drive electromagnetic surface area can be maximized as it is used in a ducted application (ducted wind ring generator), (2) the electromagnetic flux and coil in the stator can be spread along the axial length of the ring or duct as a significant distance (typically under the laws of drag aerodynamics, ⅓ the diameter of the rotor), because there is a load bearing and geometric surface to place the electromagnetics, (3) the shear pressure is maximized by the use of high power induction electromagnetic superconducting coils which density the magnetic flux (strengthening the magnetic field) due to much higher electric power carrying capacity without electrical resistance in the superconducting coils, and additionally the larger surface area available by way of the aerodynamic shaped duct which contain the ring generators.

In the first embodiment, for a given size (diameter and surface area) the ring generator 20 can be run at a higher RPM and at higher power densities because the duct is designed such that if the front turbine rotor pressure is 1 atmosphere, then the pressure behind the front turbine rotor is 0.90 atmospheres. This is followed by a second ring generator rotor, where the atmospheric pressure at this fan face would be 0.90 atmospheres, with subsequent pressure drop in the venturi constricted duct, and the pressure drop would be 0.80 behind that rotor face, and so on. Consequently air velocity increases, and a larger amount of kinetic energy can be extracted from the passing mass air flow of the wind ring generator by the multiple ring generator fan stages. The swept surface area for kinetic energy extraction from the rotor blades can also be increased due to the ability to have greater blade chord in dimension and a higher blade count from lower mechanical drag and the blade loading being able to be taken up and secured in the outer rotor ring of the wind ring generator. Mechanical securing of the rotor blades at the distal and proximal ends by the inner hubless ring and the outer rotor ring offers the ability in the invention that the load from the force vectors of the mass air flow may be increased without adverse frequency effects of operation and destructive harmonics and cyclic fatigue to the materials which make up the construction of the blades. Consequently, the generation capacity may be increased to extract that energy from the higher velocity airflow in the duct.

Second Embodiment

Figure 8:
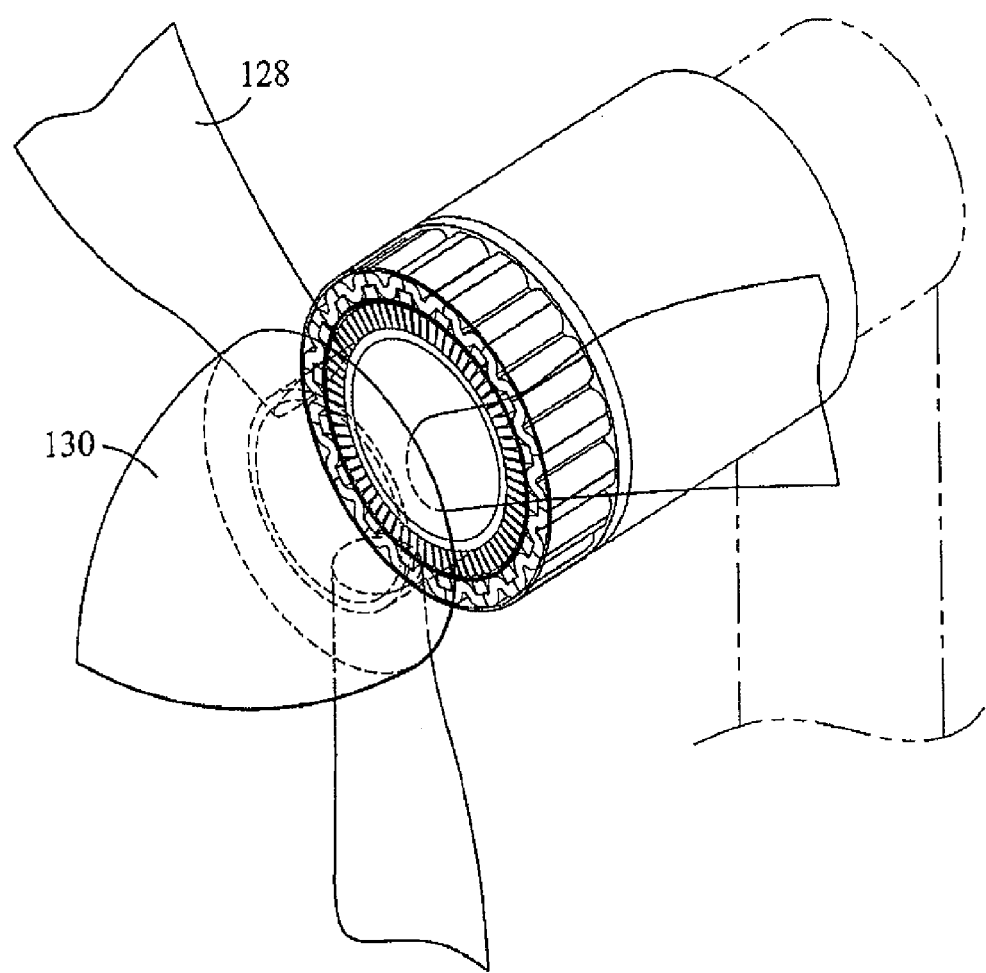
FIG. 8 is a perspective, partially transparent view of a ring turbine generator in accordance with a second disclosed embodiment illustrating the relationship between the inner and the outer rings relative to other components.
Figure 9:
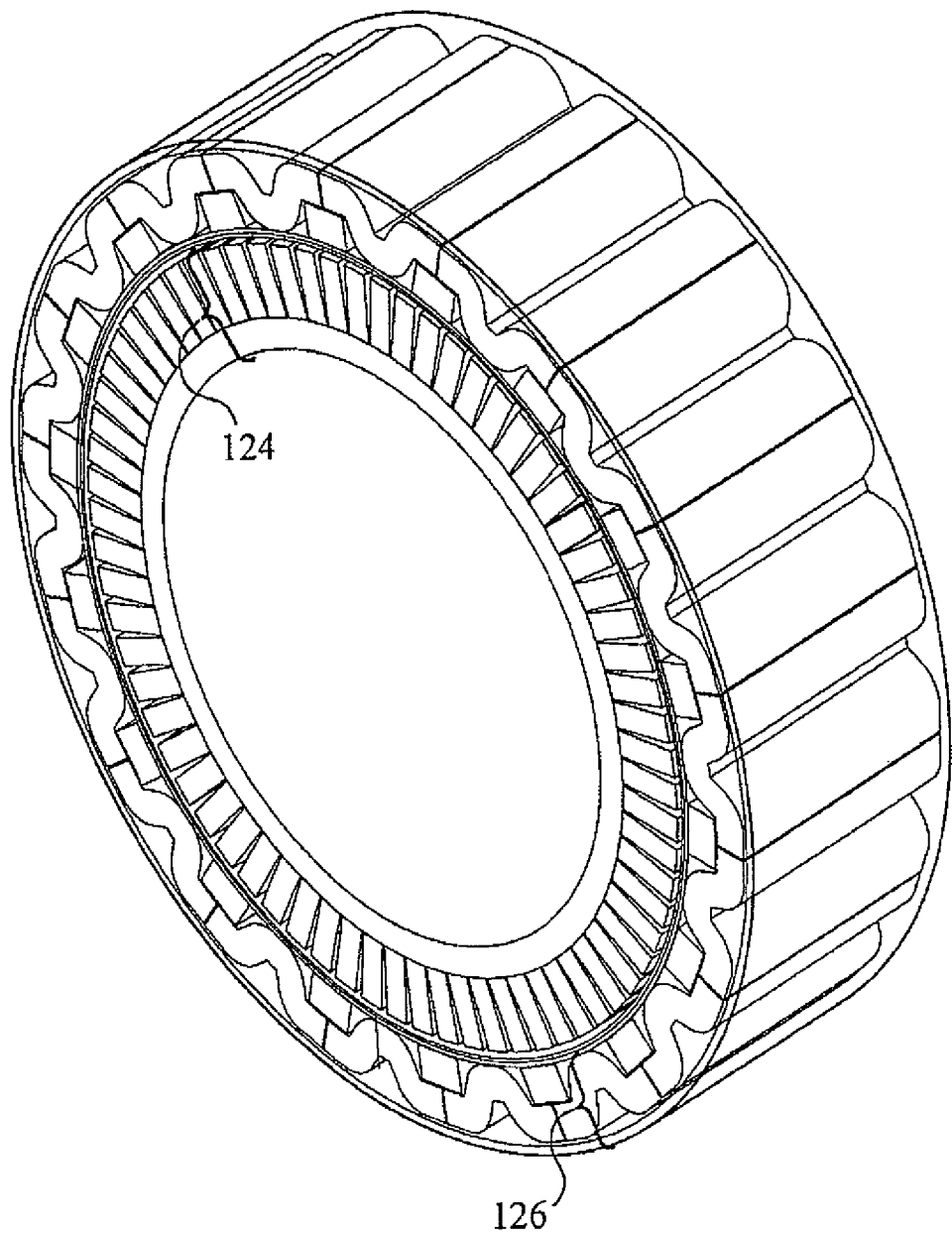
FIG. 9 is an enlarged perspective, partially transparent view of the inner and the outer rings of the generator.

In the second exemplary embodiment of the wind generator system described herein the rotor airfoil blades 128 are mounted on the outside of the moving inner ring 124 (rotor) and cantilevered off the outer stationary ring 126 (stator), as illustrated in FIGS. 8-9. In this second embodiment, the wind generator system 120 is a direct-drive turbine-ring-generator. The airfoil rotor blades 128, which may be of significant length in a 5.0 megawatt machine (130 feet in length per side, 260 ft total span of swept area), provide the power for the direct-drive turbine-ring-generator from the integrated rotor/hub of the system. The system utilizes the magnetic air bearing described above with respect to the first embodiment and is also used in the second embodiment to provide similar reductions in friction and aerodynamic drag. As above, this increases the ability of the wind generating system to increase the magnetic power flux density as the lack of drag provides less losses at the stator and rotor interface as the rotor spins inside the stator, the sine waves respective of the magnetic flux are aligned and decay accordingly as in a synchronous machine, as friction impacts the decay rate of the magnetic flux from electromagnet HTS magnetic pole to magnetic pole, or coil to coil. The order of magnitude of energy, or decay rate savings, at the interface of the rings is approximately 5%-10%.

In the second embodiment of the invention with the same HTS, direct drive, ring turbine generator, the rotor includes inner and outer rotor rings and the airfoil blades are affixed directly to the inner and outer rotor rings and extend in a cantilevered manner therefrom. In this configuration, low rotational speeds may be realized and, as discussed above, magnetic field fluxes may be maintained at very low rpm (below 12 RPM in a 5.0 MW or 10.0 MW machine) because of the capability of the HTS coils to give rise to 3-5 times higher magnetic flux strengths and power densities, magnetic bearing off-sets frequency losses, silicone carbide switching technology reduces heat loss and offers momentary net savings in storage across the sine wave decay rate gap, off-setting magnetic flux decay rates, and because of the zero drag and zero friction magnetic air bearings offer with sustained counter forces to overcome mechanical friction, super low generation speeds for high power electric generation may be achieved.

In this second embodiment of the invention, as discussed above, the rotor blades 128 are not on the interior of the rotor as in the first embodiment, but rather, are on the exterior, extending distally out into space, and are supported on a dual (double) rotating, magnetically levitated load bearing surface between an inner and outer rotor ring (of integral geometry as the rotor of the ring generator), forming the interface of the rotating ring generator rotor, and the stator. In this second embodiment, the visual configuration of the wind generator appears similar to current art in that it has multiple rotor blades (or more) coming from a central hub. Advantageously, the rotor blade number may be increased without inherent frequency load losses, or inertial gains (due to higher blade count) because of the perfect cantilevered rotor blade load bearing shaft (which also houses the integral pitch control mechanism to the blades). In this embodiment, in some applications increasing the number of rotor blades (for example to five) may be desired due to system requirements. In this case, as discussed in more detail below, morphing a rotor blade with a mechanically actuated or smart material actuated system, i.e. piezioelectrics, Airfoil geometry is possible to increase the swept area of the blades, or to reduce the blade length, which is also beneficial under some circumstances. This would essentially reduce the inertial mass to be overcome to generate power, and the swept area may therefore be manipulated to maximize airfoil efficiency for any given rotor configuration, wind condition, or any combination of the two. What is different from the first embodiment described above, is how the blades extend distally from the inner and outer rotor rings, so that in this embodiment there is no hub as in current wind generators. In this embodiment there is the HTS coils and the direct drive ring generator but because there is no drive shaft or gear box, there is no hub as in current designs. The rotor blade airfoils are cantilevered outward and the load of the airfoils is held between two inner and outer ring rotors, which hold the permanent magnets, which are sandwiched in between, side on side, two ring stators, which house the HTS generation coils (or electromagnets). This configuration offers several advantages. Again as in the first embodiment, no drive shaft is needed to act as a load bearing surface as the inner and outer rotor are the actual structure that holds the blades in a cantilevered manner. Secondly, the inner and outer rotor are positioned so that they can house actuators that allows the pitch position of the airfoil to be changed, or the airfoil angle to the oncoming mass airflow to be changed (AOA—Angle of Attack). The configuration illustrated in FIGS. 8-11C. has an inner and outer stator for each inner and outer rotor and the generation coils, i.e., the HTS coils,) are split between the inner and outer rings. This provides some redundancy in the electromagnetics in case of coil or permanent magnet failure. Additionally, the inner and outer ring generator rotor structure, acting as a cantilevered design for the rotor blades offers strength to support an internal composite structure in the rotor blade (spars, longerons, ribs and caps) and thus the opportunity to provide the use of control surfaces on the airfoil to enhance lift of the blades and be able to "morph", or "shape" the airfoils in response to the direction or velocity of the incoming air mass. The use of airfoil blade control or "airfoil shaping" on wind turbine blades provides additional benefits. For example, the blades can be morphed or shaped to increase the coefficient of lift ("CL") across the blade and still maintain laminar flow across them. This increases the coefficient of lift and allows for the further extraction of the kinetic energy from the air mass when moving at lower velocities and the manipulation of the theoretical Betz Limit. The second embodiment also offers the outer ring rotor to have integral splines as part of a single composite structure. These splines act as rigid spars which support the aerodynamic shapes of the blade structures, and form the back bone of which actuation systems to morph the rotor blades are made possible (either mechanical or piezioelectrics), located on the insides of the blades.

Figure 10:
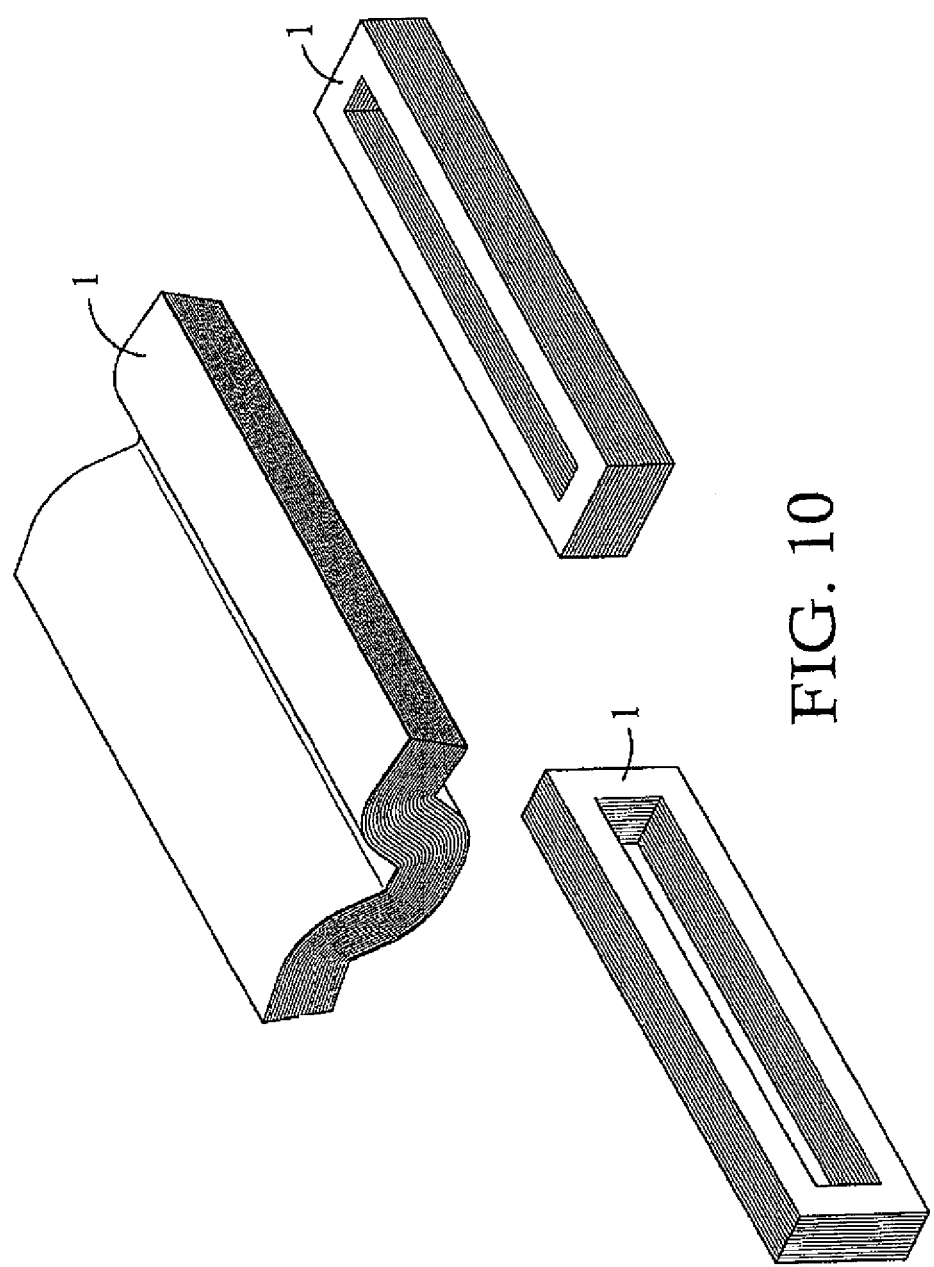
FIG. 10 partial exploded view of the rotor and stator components of FIG. 9 illustrating their orientation relative to the axis.
Figure 11A:
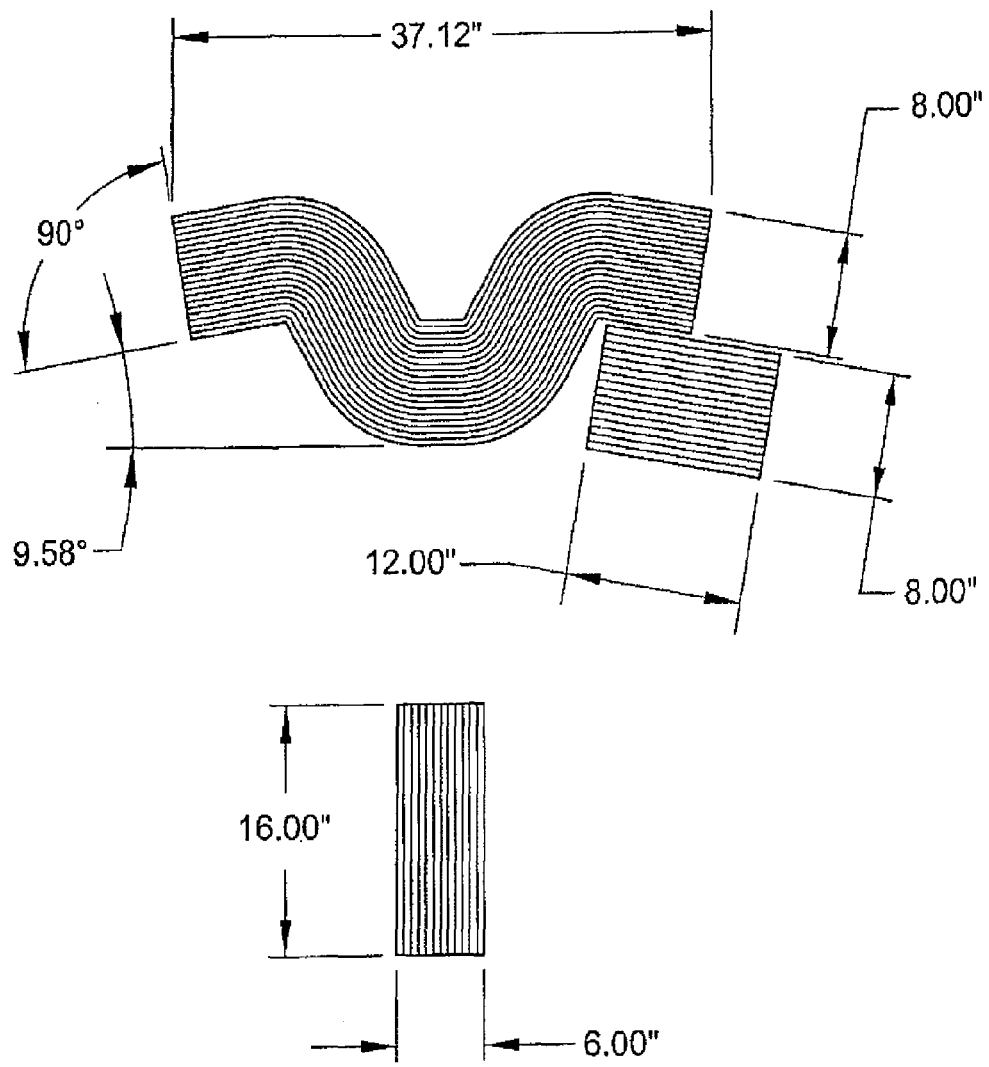
FIGS. 11A-C illustrate various spacing arrangements of the components of FIG. 10.
Figure 11B:
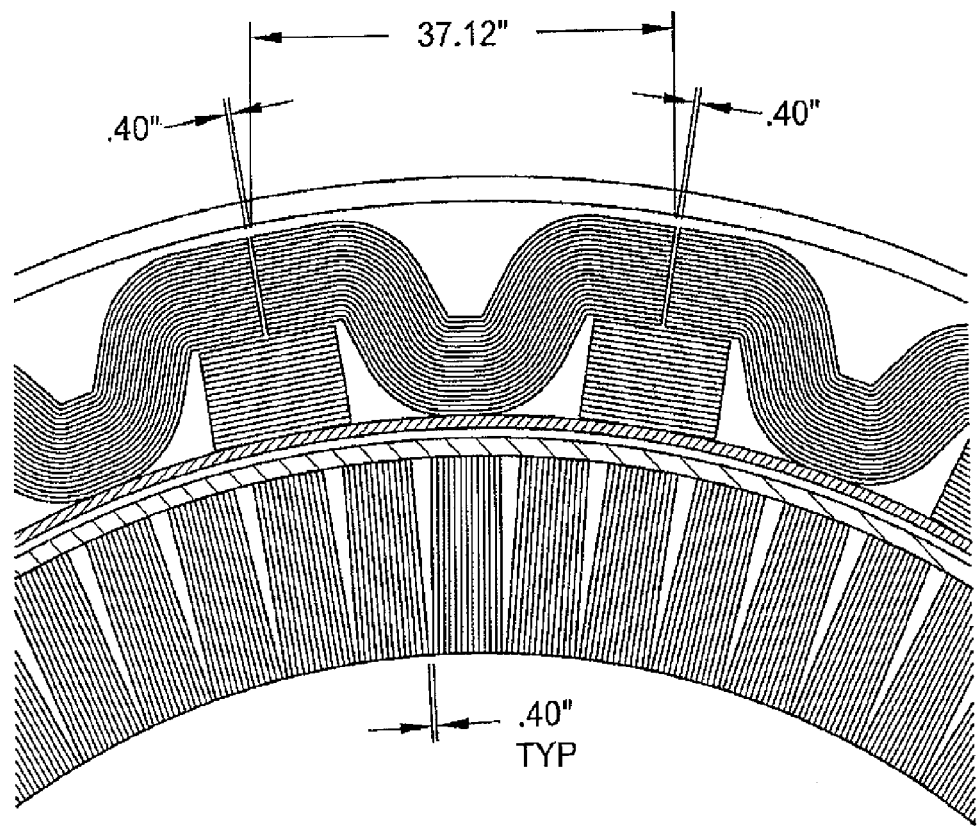
Figure 11C:
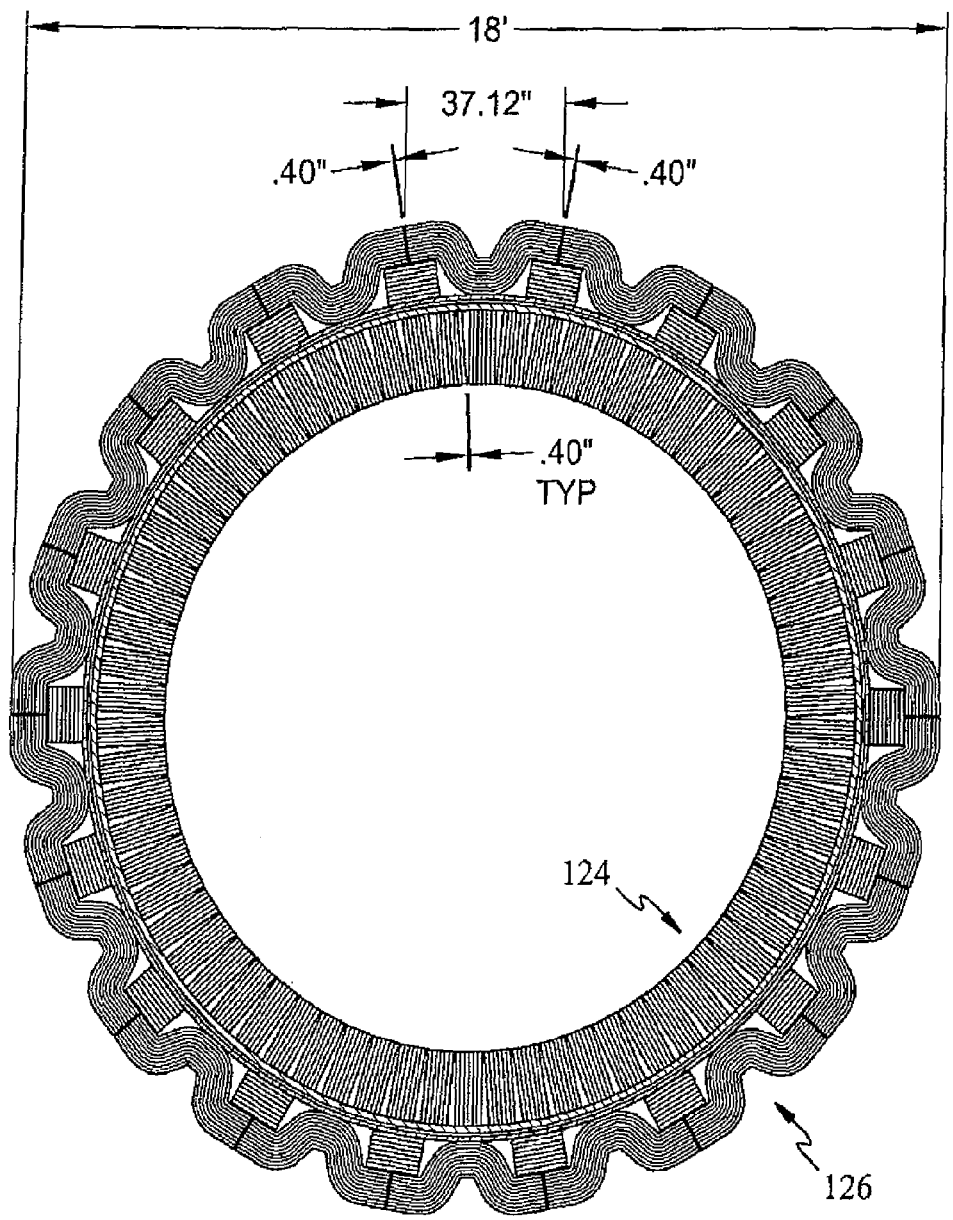
Figure 12:
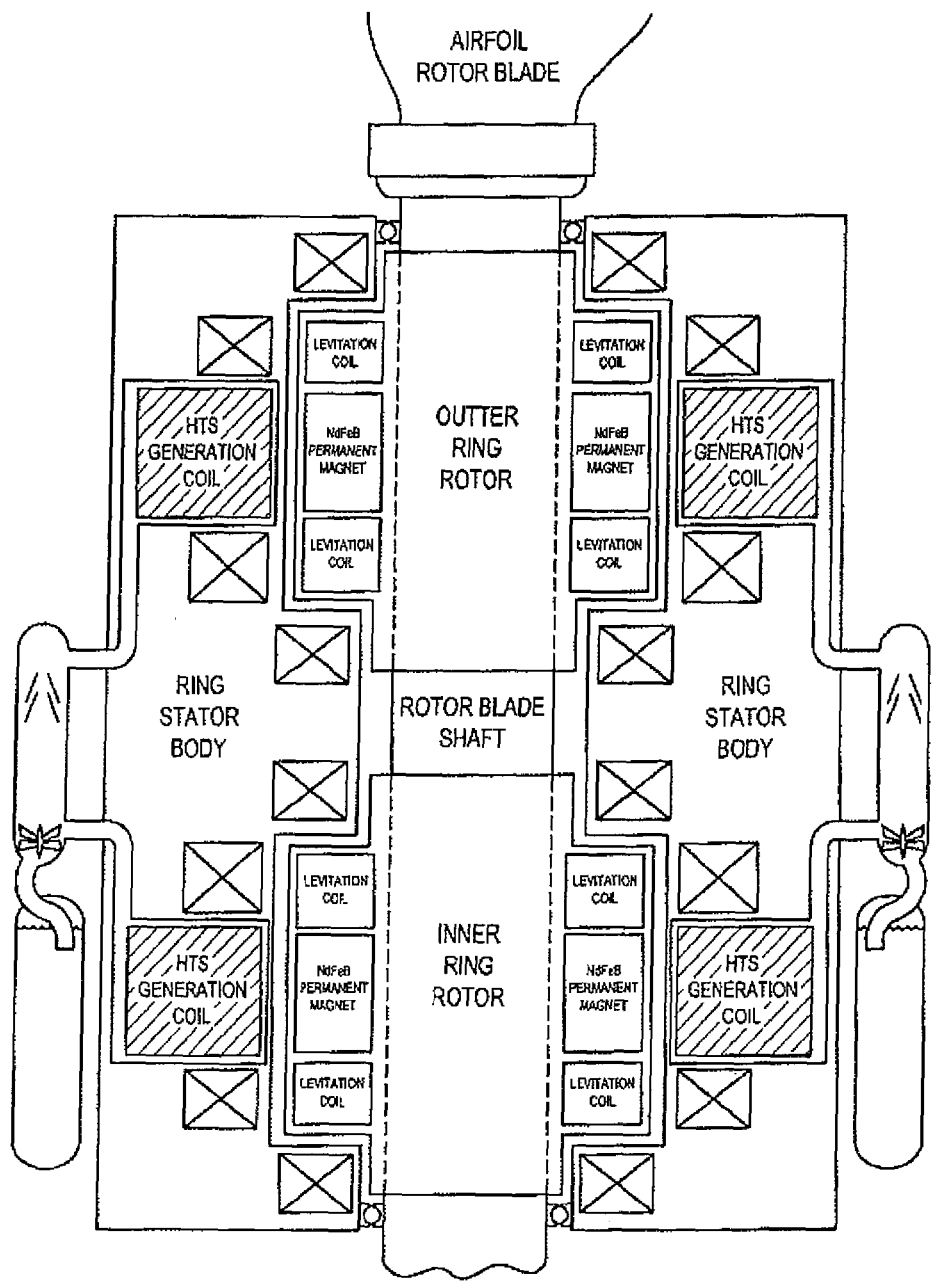
FIG. 12 is a partially cutaway view of an alternative embodiment of the ring turbine generator of FIG. 8 illustrating the components of the cooling system relative to the components of the levitation system.

In the second embodiment of the invention the wind ring generator utilizes the outer ring to become the rotor and the inner ring to become the stator, the rotor is cantilevered between two fore and aft stators with twin, aligned NdFeB permanent magnet arrays around the circumference of the rotor forming a twin rotor in a single rotating unit as an outer ring, and tether is an inner rotor ring, in similar configuration, of which rotor blade shafts and splines are cantilevered also through both rotors to which, inboard, inside the inner rotor ring contains the integrated pitch drive mechanism of the blades, as illustrated in FIGS. 10-11C. In this configuration the wind ring would be smaller and essentially form the hub of a sequence of airfoiled rotor blades coming perpendicularly out and away from the surface of the outer rotating ring held at their proximal ends, and ending at some determined diameter and swept blade area with the tips at the distal ends. The advantage of this configuration is that it is direct drive system, requiring no gear box, and the ring turbine generator offers a large surface area and volume as a single generation machine, direct drive and no gearbox nor drive shaft. Weight savings are significant in the removal of both drive shaft and gear box as well as volume reduction and lower cost to manufacture and operate. As previously described in a second embodiment of the invention, similarly to the first, the high temperature superconducting, direct drive, turbine wind ring generator is sized so that the rotor blades are not on the interior, but are on the exterior, extending distally out into space, and are supported on a rotating magnetic levitation load bearing, at the interface of a dual rotating inner and outer rotor, suspended by a twin fore and aft ring stator, integrated as a single ring generator assembly, it completes the assembly of the turbine wind ring HTS, direct drive generator. In this second embodiment, the configuration as seen visually, is similar to current art in that it has three rotor blades coming from a central hub. However, what is different is how the blades come out distally from the hub, or in this case a non-hub. In this embodiment there is know hub, the HIS, direct drive, ring generator is the hub. The rotor blades are cantilevered to hold the load between two inner and outer ring rotors, which hold the permanent magnets, which are sandwiched in between, side on side, two, twin fore and aft ring stators, which house the HTS electromagnets. This configuration offers several advantages compared to current art. No drive shaft is needed to act as a load bearing surface as the inner and outer rotor act as a cantilevered structure to hold the blades. Secondly, the inner and outer rotor are positioned so that they can house the actuators in order to change the pitch position, or blade angle to the oncoming mass airflow. This configuration has an inner and outer stator, both fore and aft, for each inner and outer rotor, the electromagnetics are split between the inner and outer ring. Additionally, because the cantilevered rotor blade system can carry a greater load on the blade, composite airfoil structure may be added to improve, stiffness, bending moment optimization, actuation device mountings, and airflow devices to improve laminar flow across the blade, reduce cross flow turbulence, therefore reducing drag. These are novel approaches to wind rotor blade and airfoil design and have not been done before.

As can be seen from the description contained herein, there are, in elements between the first and second disclosed embodiment, particular with respect to the HTS coils, the levitation magnetic system, the Hallbach array and the permanent magnets. In both the first and second embodiments, the wind generation systems represent the case of extracting the kinetic energy from the wind by the impingement of a moving mass of air against the swept area of a given size of rotating blades, at a given angle of attack (AOA) to the impinging moving air mass, with the blades representing the swept area of the wind generator, connected to an inner ring rotor containing permanent magnets, and rotating past a series of superconducting induction coils in a stator, with the rotor magnetically levitated and suspended in axial, in-plane and out-of-plane loads by an array of permanent magnets in the rotor trunion, and suspended by repulsing magnetic forces through electromagnetic switching flux components of Halbach Arrays in the side walls and base of the stator ring, and synchronus silicone carbide switching technology which aligns generated sine waves from the rotating permanent magnets past the generation coils and optimizes a low speed and high speed HTS wind ring turbine generation machine capability for both very high and very low wind speed generation capability, and thus generates electricity in this wind ring superconducting turbine generator, and that the mass air flow rotates the swept area of propellers of the inner ring rotor past the stationary electromagnetic induction stator, thus being able to generate electricity.

Another advantage of both embodiments is the lack of, or the nearly complete removal of, mechanical drag as the ring generator containing the blades is suspended in magnetically levitated state via a Halbach Array of permanent magnets and coils fitted within the stator and rotor of the ring generator is unique and novel in the invention as compared to current art, and has not been done before. A high surface area ratio to magnetic power density of the power coils is possible since the coils may be distributed down the axial length of the ring generator, flat and in looped configuration extending surface area and volume, which further improves the flux density and power output, and around its outer circumference, thus increasing the power density of the design, and the ability to position a greater number of coils in a given space, in terms of surface area.

In both embodiments, the impact of superconducting electromagnetics implemented in a ring generator architecture brings electrical resistance to zero, this raises generation capacity per megawatt hour per kilogram of weight or per cubic centimeter of volume (cm3) per megawatt hour, for power density, equal to ten to twenty times higher the power density of conventional copper coiled induction/generation coil designs which are current art and directly derives a low Betz Limit, or power efficiency. Superconducting electromagnetics is optimized at two limits. The maximum velocity limit of tangential forces impinging on the rotational inertia of the rotor as compared to the stationary stator of the generator, and at minimal velocity of tangential forces on the inertia of the rotor blades to be overcome, to create an impedance or change in electric discharge generated, and development of non-synchronus sine waves which should be brought back into synchronus sine waves, to achieve the desired synchronus and induced DC current and minimize normal (or out of plane), deletirus magnetic fields (which reduce overall power generated). The higher the rotational speed and the tangential vectors of the machine the greater the power efficiency, or "theta $\Theta$" as it relates to the derivative of the kinetic energy alpha=å in the wind. The lower the rotational speed, once inertial forces have been overcome, and the induction of a current, once the impedance of generated sine waves has been overcome, and after synchronizing them with the silicone carbide switching technology, then the in-plane magnetic flux is also maximized and the normal field controlled, by minimizing the normal field magnetic flux through decay rate in-plane reduction, and therefore reducing the deleterious effects of the normal field to the stator generation coils. The rotor is magnetically levitated on an air bearing which is sustained between the stator and a series of Halbach Arrays and Neodinium Iron-Boron (NdFeB) permanent magnets to generate repulsive forces. The magnetic levitation is created by repulsion forces between the electromagnetic induced field in the superconducting coils and the opposing charge in the Halbach Arrays. An array of high fidelity positioning sensors positions the rotating inner ring with the cantilevered rotor blades, with the stationary outer ring at any given point in time, maintaining a magnetic flux force of 3-4 tesla at 0.05" tolerance at roughly 1750 lb/sq. in centripetal force. High magnetic flux is maintained of the electromagnetic field of the magnetic levitation bearings and the induction power generation flux field by an array of "magnetic flux diverters" tangential to the circumference of the outer perimeter of the stator ring, which is novel to the invention and further reduces the deleterious effects of the normal field component upon the in-plane magnetic flux field for power generation. This nullifies, or can almost reduce to zero, the normal component of the field and maximizes the generation coil flux field (axial component of the field) for optimal generation performance of the superconductors. This in turn maximizes energy generation capacity and raises the power generation density to a maximum level, as the normal field component and its deleterious effects upon the axial plane field is removed.

One structure which is novel to the invention is that the blade tips have a wing tip fence 236, as illustrated in FIG. 13A. This shape prevents the dumping of faster moving air across the upper surface of the blade from slipping off of the tip due to cross flow turbulence due to the root-tip chord ratio changing down the length of the blade due to taper, and creating rotor blade tip vorticies which are damaging to the overall efficiency of the lifting surface of the airfoil. This advantage is most important as on the invention of wing fences on a wind turbine generator it will improve efficiencies by as much as 10%-12% of the rotor blade airfoil, that is the airfoil lifting efficiency, the ability of the airfoil to extract kinetic energy from the wind. Other new concepts of the invention that will be applied to the prototype are inboard airfoil spoilers to reduce lift and reduce airflow in high wind and high structural load conditions, but still generate power without shutting down the ring generator. Similar to gliders that use spoilers to reduce lift across the wing, the spoilers reduce the lift of the rotor blade in high wind conditions, above 60 mph, however, they are designed as not so much to spoil the lift over the entire swept area of the blades so the invention of the turbine will still spin and generate electric power.

Additionally, the inner and outer ring generator rotor structure, acting as a cantilevered design for the rotor blades offers strength to support internal composite structure in the blade and thus the opportunity to support the use of control surfaces to enhance lift of the blades and be able to "morph", or "shape" the rotor blade airfoils, as illustrated in FIG. 13C. This is novel and has not been done before in wind energy turbine generation art. The use of airfoil blade control on wind turbine blades provides additional benefits than present in current art. Most importantly, the blades can be morphed or shaped to increase the coefficient of lift across the blade and still maintain laminar flow. Increases of the coefficient of lift will allow for the extraction of the kinetic energy at lower wind speeds. The invention, offers the outer ring rotor to have integral splines as part of a single composite structure. These splines act as rigid spars which support the aerodynamic shapes of the blade structures, and form the back bone of which actuation systems to morph the rotor blades are made possible, located on the insides of the blades.

In accordance with a third aspect of the invention, the turbine rotor blade 228 as illustrated in FIGS. 13A-C, has a number of improvements designed to increase its efficiency. Specifically, as illustrated blade 228 may have one or more wing flaps 230 which may be actuated to decrease the lift for operation in high wind conditions, as illustrated in FIG. 13B. The wing flaps, may be coupled to actuator mechanisms 232 which may be connected to in integral root spar 234, as illustrated in FIG. 13A. In addition, blade 228 may have a winglet 236 attached at the end thereafter prevent airflow slippage. FIG. 14C illustrates a cross-sectional, perimeter profile of wing 228 illustrating leading edge slat 238 and trailing edge flap 240, respectively, with alternative positions illustrated in phantom. The use of leading edge slat 238 on the rotor blade 228 increases the lift coefficient of the blade and provides the ability of the turbine to generate power at very low wind speeds, dramatically increasing pressure on the bottom of blade. The use of trailing edge flap 240, as illustrated, allows for two position morphing and increases pressure at the bottom of the blade. As such, the cross-sectional perimeter profile of the blade or airfoil may be manipulated in order to increase the efficiency of the turbine utilizing the an actuating mechanism.

Having described herein illustrative embodiments of the disclose concept, persons of ordinary skill in the art will appreciate various other features and advantages thereof apart from those specifically described above. It should therefore be understood that the foregoing is only illustrative of the disclose principles, and that various modifications and additions can be made by those skilled in the art without departing from the spirit and scope of the invention. Accordingly, the appended claims shall not be limited by the particular features which have been shown and described, but shall be construed also to cover any obvious modifications and equivalents thereof.

What is claimed is:

1. A wind turbine ring generator apparatus comprising:
a stationary, ring-shaped stator; and
a ring-shaped rotor concentrically disposed relative to the ring-shaped stator about a common axis and separated therefrom, the ring-shaped rotor having an interior diameter and at least one rotor blade extending across a portion of the interior diameter and attached to the ring-shaped rotor so that the at least one rotor blade and the ring-shaped rotor move in unison relative to the ring-shaped stator when airflow impinges the at least one rotor blade.

2. The apparatus of claim 1 comprising a plurality of rotor blades extending across a portion of the interior diameter and attached to the ring-shaped rotor.

3. The apparatus of claim 2 wherein the plurality of rotor blades have first respective ends movably attached to the ring-shaped rotor and second respective ends movably attached to a central hub.

4. The apparatus of claim 1 in combination with a plurality of wind turbine ring generators each having the ring-shaped stator and the ring-shaped rotor and wherein the plurality of wind turbine ring generators are arranged sequentially along the common axis.

5. The apparatus of claim 4 further comprising:
a shroud at least partially surrounding one or more of the plurality of wind turbine ring generators.

6. The apparatus of claim 5 wherein respective diameters of adjacent wind turbine ring generators along the common axis are dissimilar.

7. A wind turbine apparatus comprising:
a stationary, ring-shaped stator;
a hub; and
a ring-shaped rotor concentrically disposed relative to the ring-shaped stator and separated therefrom, a plurality of rotor blades operatively coupled to the ring-shaped rotor and extending in a cantilever from the hub radially outward from the rotor so that the rotor blades and the ring-shaped rotor move in unison relative to the ring-shaped stator when airflow impinges the plurality of rotor blades.

8. The apparatus of claim 7 further comprising a support member operatively coupled to the ring-shaped stator.

9. The apparatus of claim 1 further comprising:
a plurality of rotor blades having one end operatively and movably attached to the ring-shaped rotor wherein at least two of the rotor blades simultaneously have different angle or pitch relative to the common axis.

10. The apparatus of claim 1 further comprising: a sensor embedded within the rotor blade.

11. The apparatus of claim 1 wherein the wind turbine ring generator is devoid of a drive shaft.

12. The apparatus of claim 1 wherein the wind turbine ring generator is devoid of a gearbox.

13. The apparatus of claim 1 wherein the wind turbine ring generator is devoid of mechanical bearings.

14. The apparatus of claim 7 wherein the wind turbine is devoid of any of a drive shaft, gear box, and mechanical bearings.

15. A wind turbine ring generator apparatus comprising:
a plurality of wind turbine ring generators arranged sequentially along a common axis, wherein each of the plurality of wind turbine ring generators includes:
a stationary, ring-shaped stator; and
a ring-shaped rotor concentrically disposed relative to the ring-shaped stator about the common axis and separated therefrom, the ring-shaped rotor having an interior diameter and at least one rotor blade extending across a portion of the interior diameter and attached to the ring-shaped rotor so that the at least one rotor blade and the ring-shaped rotor move in unison relative to the ring-shaped stator.

16. The apparatus of claim 15 further comprising:
a shroud at least partially surrounding one or more of the plurality of wind turbine ring generators.

17. The apparatus of claim 16 wherein respective diameters of adjacent wind turbine ring generators along the common axis are dissimilar.

* * * * *